(12) United States Patent
Bhushan et al.

(10) Patent No.: US 8,913,479 B2
(45) Date of Patent: *Dec. 16, 2014

(54) FLEXIBLE TIME-FREQUENCY MULTIPLEXING STRUCTURE FOR WIRELESS COMMUNICATION

(75) Inventors: Naga Bhushan, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/246,616

(22) Filed: Sep. 27, 2011

(65) Prior Publication Data

US 2012/0014392 A1   Jan. 19, 2012

Related U.S. Application Data

(63) Continuation of application No. 11/676,939, filed on Feb. 20, 2007, now Pat. No. 8,077,595.

(60) Provisional application No. 60/775,443, filed on Feb. 21, 2006, provisional application No. 60/775,693, filed on Feb. 21, 2006.

(51) Int. Cl.
  *H04J 11/00* (2006.01)
  *H04L 5/00* (2006.01)

(52) U.S. Cl.
  CPC ............ *H04L 5/0044* (2013.01); *H04L 5/0048* (2013.01); *H04L 5/0042* (2013.01); *H04L 5/0016* (2013.01); *H04L 5/0094* (2013.01); *H04L 5/0007* (2013.01)
  USPC ......................................................... 370/208

(58) Field of Classification Search
  USPC ....................................................... 370/208
  See application file for complete search history.

(56) References Cited

U.S. PATENT DOCUMENTS 6,078,572 A    6/2000  Tanno et al.
6,130,886 A   10/2000  Ketseoglou et al.
(Continued)

FOREIGN PATENT DOCUMENTS

EP    0959634 A2   11/1999
EP    0995275       4/2000
(Continued)

OTHER PUBLICATIONS

Fan, et al., "On the Reverse Link Performance of Cdma2000 1Xev-Do Revision A System", IEEE Xplore Online, Feb. 2005, pp. 2244-2250, XP002438335, New York, USA.

(Continued)

*Primary Examiner* — Mark Rinehart
*Assistant Examiner* — Christopher R Crompton
(74) *Attorney, Agent, or Firm* — Stanton Braden

(57) ABSTRACT

Techniques for efficiently sending data in a wireless communication system are described. Code division multiplexing (CDM) or orthogonal frequency division multiplexing (OFDM) may be selected for each traffic segment, which may correspond to specific time frequency resources. An output waveform comprised of traffic and overhead segments may be generated. Each traffic segment may carry CDM data at a chip rate if CDM is selected or OFDM data if OFDM is selected. OFDM symbols may be generated at a sample rate that may be an integer ratio of the chip rate and may have a duration that may be determined based on the traffic segment duration. The output waveform may carry CDM data and/or OFDM data on subcarriers corresponding to at least one carrier in a spectral allocation and may further carry OFDM data on remaining usable subcarriers in the spectral allocation.

26 Claims, 15 Drawing Sheets

(56) References Cited

U.S. PATENT DOCUMENTS

| | | | |
|---|---|---|---|
| 6,473,467 B1 | 10/2002 | Wallace et al. | |
| 6,694,469 B1 | 2/2004 | Jalali et al. | |
| 6,717,924 B2 | 4/2004 | Ho et al. | |
| 6,788,687 B2 | 9/2004 | Bao et al. | |
| 6,822,952 B2 | 11/2004 | Abrol et al. | |
| 6,882,632 B1 | 4/2005 | Koo et al. | |
| 6,912,214 B2 | 6/2005 | Madour et al. | |
| 6,940,894 B2 | 9/2005 | Sendonaris | |
| 6,963,534 B1 | 11/2005 | Shorey et al. | |
| 6,970,437 B2 | 11/2005 | Lott et al. | |
| 6,980,569 B1 | 12/2005 | Beyda et al. | |
| 6,987,780 B2 | 1/2006 | Wei et al. | |
| 7,002,900 B2 | 2/2006 | Walton et al. | |
| 7,042,869 B1 | 5/2006 | Bender | |
| 7,043,249 B2 | 5/2006 | Sayeedi | |
| 7,050,405 B2 | 5/2006 | Attar et al. | |
| 7,062,283 B2 | 6/2006 | Dooley | |
| 7,065,060 B2 | 6/2006 | Yun et al. | |
| 7,088,701 B1 | 8/2006 | Attar et al. | |
| 7,099,629 B1 | 8/2006 | Bender | |
| 7,127,654 B2 | 10/2006 | Jalali et al. | |
| 7,139,274 B2 | 11/2006 | Attar et al. | |
| 7,142,864 B2 | 11/2006 | Laroia et al. | |
| 7,145,940 B2 | 12/2006 | Gore et al. | |
| 7,164,649 B2 | 1/2007 | Walton et al. | |
| 7,170,876 B2 | 1/2007 | Wei et al. | |
| 7,352,722 B2 | 4/2008 | Malladi et al. | |
| 7,463,867 B2 | 12/2008 | Luo et al. | |
| 7,680,211 B1 | 3/2010 | Von der Embse | |
| 7,719,991 B2 | 5/2010 | Bhushan et al. | |
| 7,764,981 B2 | 7/2010 | Kalofonos et al. | |
| 7,986,742 B2 | 7/2011 | Ketchum et al. | |
| 8,077,595 B2 | 12/2011 | Bhushan et al. | |
| 8,363,697 B2 | 1/2013 | Grob et al. | |
| 8,396,152 B2 | 3/2013 | Attar et al. | |
| 2001/0009555 A1 | 7/2001 | Diepstraten et al. | |
| 2002/0002704 A1 | 1/2002 | Davis et al. | |
| 2002/0145990 A1 | 10/2002 | Sayeedi | |
| 2002/0193112 A1 | 12/2002 | Aoki et al. | |
| 2003/0040315 A1 | 2/2003 | Khaleghi et al. | |
| 2003/0072254 A1 | 4/2003 | Ma et al. | |
| 2003/0153327 A1 | 8/2003 | Tajiri et al. | |
| 2003/0220103 A1 | 11/2003 | Kim et al. | |
| 2003/0235147 A1 | 12/2003 | Walton et al. | |
| 2004/0022203 A1 | 2/2004 | Michelson et al. | |
| 2004/0063431 A1 | 4/2004 | Julka et al. | |
| 2004/0095851 A1 | 5/2004 | Ellner et al. | |
| 2004/0141481 A1 | 7/2004 | Lee et al. | |
| 2004/0147223 A1 | 7/2004 | Cho | |
| 2004/0179469 A1 | 9/2004 | Attar et al. | |
| 2004/0228267 A1 | 11/2004 | Agrawal et al. | |
| 2005/0063298 A1 | 3/2005 | Ling et al. | |
| 2005/0073969 A1 | 4/2005 | Hart et al. | |
| 2005/0111397 A1* | 5/2005 | Attar et al. | 370/319 |
| 2005/0111437 A1 | 5/2005 | Maturi | |
| 2005/0111599 A1 | 5/2005 | Walton et al. | |
| 2005/0135284 A1 | 6/2005 | Nanda et al. | |
| 2005/0135291 A1 | 6/2005 | Ketchum et al. | |
| 2005/0135318 A1 | 6/2005 | Walton et al. | |
| 2005/0135403 A1 | 6/2005 | Ketchum et al. | |
| 2005/0135416 A1 | 6/2005 | Ketchum et al. | |
| 2005/0141475 A1 | 6/2005 | Vijayan et al. | |
| 2005/0163262 A1 | 7/2005 | Gupta | |
| 2005/0195763 A1 | 9/2005 | Kadous et al. | |
| 2005/0249177 A1 | 11/2005 | Huo et al. | |
| 2005/0270969 A1 | 12/2005 | Han et al. | |
| 2005/0281290 A1 | 12/2005 | Khandekar et al. | |
| 2006/0013182 A1 | 1/2006 | Balasubramanian et al. | |
| 2006/0018397 A1 | 1/2006 | Sampath et al. | |
| 2006/0018411 A1 | 1/2006 | Gore et al. | |
| 2006/0023772 A1 | 2/2006 | Mudulodu et al. | |
| 2006/0078075 A1 | 4/2006 | Stamoulis et al. | |
| 2006/0088003 A1 | 4/2006 | Harris | |
| 2006/0133273 A1 | 6/2006 | Julian et al. | |
| 2006/0133521 A1 | 6/2006 | Sampath et al. | |
| 2006/0135080 A1 | 6/2006 | Khandekar et al. | |
| 2006/0136790 A1 | 6/2006 | Julian et al. | |
| 2006/0171295 A1 | 8/2006 | Ihm et al. | |
| 2006/0178153 A1 | 8/2006 | Tenny et al. | |
| 2006/0193338 A1 | 8/2006 | Zheng et al. | |
| 2006/0198344 A1 | 9/2006 | Teague et al. | |
| 2006/0203794 A1 | 9/2006 | Sampath et al. | |
| 2006/0203845 A1 | 9/2006 | Monogioudis | |
| 2006/0205413 A1 | 9/2006 | Teague | |
| 2006/0209732 A1 | 9/2006 | Gorokhov et al. | |
| 2006/0209927 A1 | 9/2006 | Khandekar et al. | |
| 2006/0217124 A1 | 9/2006 | Bi et al. | |
| 2006/0227887 A1 | 10/2006 | Li et al. | |
| 2006/0233124 A1 | 10/2006 | Palanki | |
| 2006/0233131 A1 | 10/2006 | Gore et al. | |
| 2006/0240784 A1 | 10/2006 | Naguib et al. | |
| 2006/0274712 A1 | 12/2006 | Malladi et al. | |
| 2006/0276212 A1 | 12/2006 | Sampath et al. | |
| 2006/0286974 A1 | 12/2006 | Gore et al. | |
| 2007/0010957 A1 | 1/2007 | Sampath et al. | |
| 2007/0011589 A1 | 1/2007 | Palanki | |
| 2007/0019535 A1 | 1/2007 | Sambhwani et al. | |
| 2007/0025325 A1 | 2/2007 | Kumar | |
| 2007/0025345 A1 | 2/2007 | Bachl et al. | |
| 2007/0030839 A1 | 2/2007 | Vimpari et al. | |
| 2007/0070942 A1 | 3/2007 | Harris et al. | |
| 2007/0071127 A1 | 3/2007 | Gore et al. | |
| 2007/0087749 A1 | 4/2007 | Ionescu et al. | |
| 2007/0195688 A1 | 8/2007 | Bhushan et al. | |
| 2007/0195723 A1 | 8/2007 | Attar et al. | |
| 2007/0195740 A1 | 8/2007 | Bhushan et al. | |
| 2007/0195747 A1 | 8/2007 | Attar et al. | |
| 2007/0195899 A1 | 8/2007 | Bhushan et al. | |
| 2007/0293172 A1 | 12/2007 | Shi et al. | |
| 2008/0151743 A1* | 6/2008 | Tong et al. | 370/204 |
| 2009/0067405 A1 | 3/2009 | Zhang et al. | |
| 2009/0310702 A1 | 12/2009 | Lewis | |
| 2012/0269052 A1 | 10/2012 | Chen et al. | |

FOREIGN PATENT DOCUMENTS

| | | |
|---|---|---|
| EP | 1367760 A2 | 12/2003 |
| EP | 1422851 A1 | 5/2004 |
| EP | 1619847 A2 | 5/2004 |
| EP | 1489775 A1 | 12/2004 |
| EP | 1513304 A2 | 3/2005 |
| EP | 1542488 A1 | 6/2005 |
| EP | 1565015 A2 | 8/2005 |
| EP | 1596525 A1 | 11/2005 |
| EP | 1608120 A2 | 12/2005 |
| GB | 2394871 A | 5/2004 |
| JP | H10303848 A | 11/1998 |
| JP | 2000504908 T | 4/2000 |
| JP | 2000270024 | 9/2000 |
| JP | 2002320260 A | 10/2002 |
| JP | 2002374562 A | 12/2002 |
| JP | 2002544733 | 12/2002 |
| JP | 2003152679 A | 5/2003 |
| JP | 2003533078 | 11/2003 |
| JP | 2004158901 A | 6/2004 |
| JP | 2005536967 T | 12/2005 |
| JP | 2006270968 A | 10/2006 |
| KR | 20040029416 | 4/2004 |
| KR | 2005120806 | 12/2005 |
| RU | 2238611 C1 | 10/2004 |
| RU | 2004117217 A | 3/2005 |
| WO | WO0069203 | 11/2000 |
| WO | WO01080477 | 10/2001 |
| WO | 03017688 A2 | 2/2003 |
| WO | 03034644 A1 | 4/2003 |
| WO | 03096581 A1 | 11/2003 |
| WO | 2004004269 | 1/2004 |
| WO | WO2004038984 A2 | 5/2004 |
| WO | 2004056142 | 7/2004 |
| WO | 2004057894 A1 | 7/2004 |
| WO | WO2004098098 | 11/2004 |
| WO | 2004114548 A1 | 12/2004 |
| WO | 2004114549 | 12/2004 |
| WO | 2005015775 A1 | 2/2005 |

(56) References Cited

FOREIGN PATENT DOCUMENTS

| WO | WO2005032001 A1 | 4/2005 |
| WO | WO2005048640 | 5/2005 |
| WO | WO2005067247 A1 | 7/2005 |
| WO | 2005088882 A1 | 9/2005 |
| WO | 2005125139 A1 | 12/2005 |

OTHER PUBLICATIONS

International Search Report—PCT/US2007/062526, International Search Authority, European Patent Office, Dec. 5, 2007.

Ojanpera, T. et al., "Frames—Hybrid Multiple Access Technology," IEEE International Symposium on Spread Spectrum Techniques and Applications, No. 1, Sep. 22, 1996, pp. 320-324.

Rohling, H et al., "Performance Comparison Of Different Multiple Access Schemes For the Downlink of an OFDM Communication System", Vehicular Technology Conference, 1997, 47th IEEE, vol. 3, May 3-7, 1997, pp. 1365-1369.

Taiwan Search Report—TW096106487—TIPO—Dec. 15, 2010.

Written Opinion—PCT/US2007/062526, International Search Authority, European Patent Office, Dec. 5, 2007.

* cited by examiner

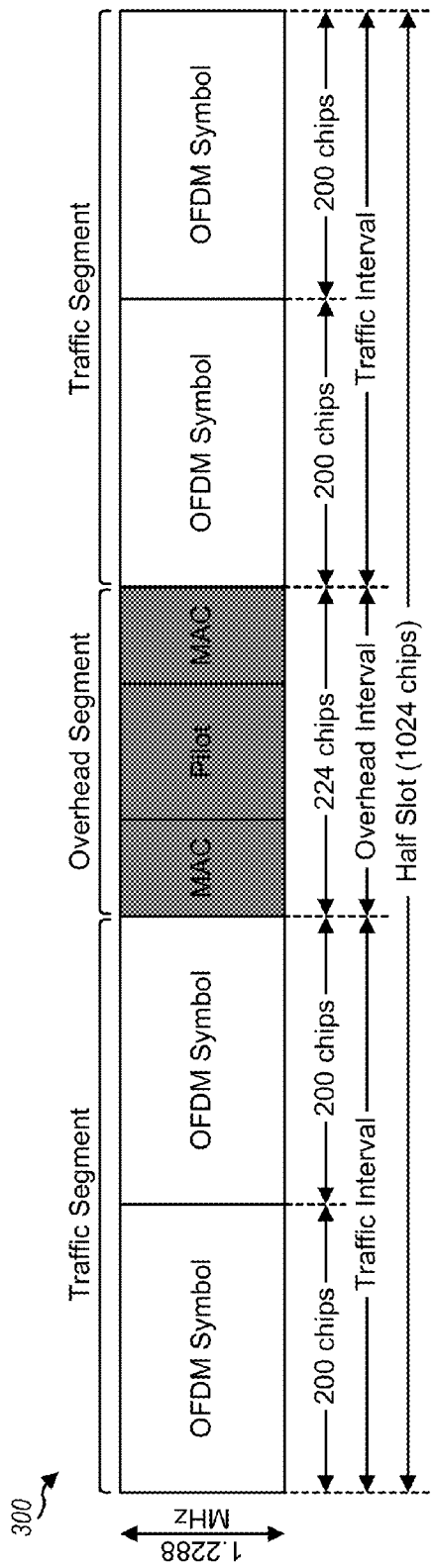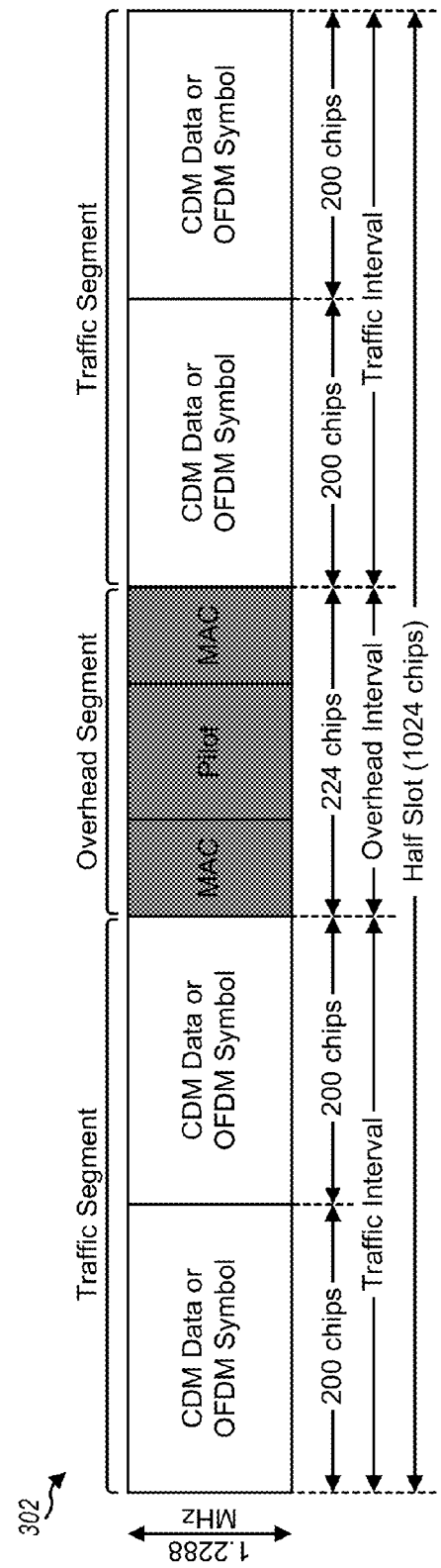

FLEXIBLE TIME-FREQUENCY MULTIPLEXING STRUCTURE FOR WIRELESS COMMUNICATION

CLAIM OF PRIORITY UNDER 35 U.S.C. §119

The present application for patent is a continuation application of and claims priority to patent application Ser. No. 11/676,939, entitled, "Flexible Time-Frequency Multiplexing Structure For Wireless Communication", filed on Feb. 20, 2007, and also claims priority to Provisional Application Ser. No. 60/775,443, entitled "Wireless Communication System and Method," and Provisional Application Ser. No. 60/775,693, entitled "DO Communication System and Method," both filed Feb. 21, 2006, assigned to the assignee hereof, and expressly incorporated herein by reference.

BACKGROUND

I. Field

The present disclosure relates generally to communication, and more specifically to transmission techniques for a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A multiple-access system may utilize one or more multiplexing schemes such as code division multiplexing (CDM), time division multiplexing (TDM), etc. The system may be deployed and may serve existing terminals. It may be desirable to improve the performance of the system while retaining backward compatibility for the existing terminals. For example, it may be desirable to employ spatial techniques such as multiple-input multiple-output (MIMO) and spatial division multiple access (SDMA) to improve throughput and/or reliability by exploiting additional spatial dimensionalities provided by use of multiple antennas.

There is therefore a need in the art for transmission techniques that can support advanced communication techniques (e.g., spatial techniques) and improve bandwidth utilization while retaining backward compatibility for existing terminals.

SUMMARY

Techniques for efficiently sending and receiving data in a wireless communication system are described herein. The techniques utilize a slot structure that is backward compatible with existing design. The techniques also selectively employ orthogonal frequency division multiplexing (OFDM) to efficiently support spatial techniques and/or other advanced communication techniques.

According to an aspect, an apparatus is described which selects CDM or OFDM for each of at least one traffic segment. Each traffic segment may correspond to specific time frequency resources. The apparatus generates an output waveform comprised of the at least one traffic segment, with each traffic segment carrying CDM data if CDM is selected for the traffic segment or OFDM data if OFDM is selected for the traffic segment. CDM data is data processed based on CDM, e.g., channelized with different orthogonal codes. OFDM data is data processed based on OFDM, e.g., sent on multiple subcarriers in the frequency domain.

According to another aspect, an apparatus is described which selects CDM or OFDM for a traffic interval, generates CDM data at a chip rate and sends the CDM data in the traffic interval if CDM is selected, and generates at least one OFDM symbol at a sample rate and sends the at least one OFDM symbol in the traffic interval if OFDM is selected. The sample rate is related to the chip rate by an integer ratio. Each OFDM symbol has a duration determined based on the duration of the traffic interval.

According to yet another aspect, an apparatus is described which determines a first set of subcarriers corresponding to at least one carrier in a spectral allocation and also determines a second set of subcarriers corresponding to remaining usable subcarriers in the spectral allocation. The apparatus generates an output waveform comprising CDM data or OFDM data or both CDM data and OFDM data on the first set of subcarriers and further comprising OFDM data on the second set of subcarriers.

According to yet another aspect, an apparatus is described which generates a first set of at least one OFDM symbol in accordance with a first OFDM symbol numerology for a first terminal and generates a second set of at least one OFDM symbol in accordance with a second OFDM symbol numerology for a second terminal. The first and second OFDM symbol numerologies may be associated with different OFDM symbol durations, different numbers of subcarriers, different cyclic prefix lengths, etc.

According to yet another aspect, an apparatus is described which determines whether CDM or OFDM is used for a traffic segment, processes received samples to recover CDM data sent in the traffic segment if CDM is used, and processes the received samples to recover OFDM data sent in the traffic segment if OFDM is used.

Various aspects and features of the disclosure are described in further detail below.

BRIEF DESCRIPTION OF THE DRAWINGS

FIG. 3A shows a single-carrier slot structure that supports OFDM.

FIG. 3B shows a single-carrier slot structure that supports CDM and OFDM.

DETAILED DESCRIPTION

The transmission techniques described herein may be used for various wireless communication systems such as CDMA, TDMA, FDMA, OFDMA, and SC-FDMA systems. The terms "systems" and "networks" are often used interchangeably. A CDMA system may implement a radio technology such cdma2000, Universal Terrestrial Radio Access (UTRA), Evolved UTRA (E-UTRA), etc. cdma2000 covers IS-2000, IS-95 and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Long Term Evolution (LTE) (which is part of E-UTRA), IEEE 802.20, Flash-OFDM®, etc. UTRA, E-UTRA, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

The techniques may be used to support MIMO, SDMA, and other advanced communication techniques. For MIMO and SDMA, both inter-symbol interference due to multipath and spatial (or inter-layer) interference due to simultaneous transmission of multiple data streams should be addressed in order to maximize signal-to-noise-and-interference ratio (SINR) and link throughput. OFDM is better suited than CDM for spatial techniques such as MIMO and SDMA because OFDM provides a simple mechanism to combat inter-symbol interference. By using OFDM, a MIMO/SDMA design may just address spatial interference. Hence, it is desirable to replace CDMA waveform components with OFDM waveform components whenever spatial techniques such as MIMO and SDMA are employed. The available spectrum may also be better utilized with OFDM, as compared with multi-carrier CDMA, whenever the available spectrum (excluding the guard band) is not an integer multiple of the bandwidth of a single-carrier CDMA waveform.

For clarity, various aspects of the techniques are described below for a High Rate Packet Data (HRPD) system that implements IS-856. HRPD is also referred to as Evolution-Data Optimized (EV-DO), Data Optimized (DO), High Data Rate (HDR), etc. The terms HRPD and EV-DO are often used interchangeably. Currently, HRPD Revisions (Revs.) 0, A, and B have been standardized, HRPD Revs. 0 and A are deployed, and HRPD Rev. C is under development. HRPD Revs. 0 and A cover single-carrier HRPD (1xHRPD). HRPD Rev. B covers multi-carrier HRPD and is backward compatible with HRPD Revs. 0 and A. The techniques described herein may be incorporated in any HRPD revision. For clarity, HRPD terminology is used in much of the description below.

Figure 1:
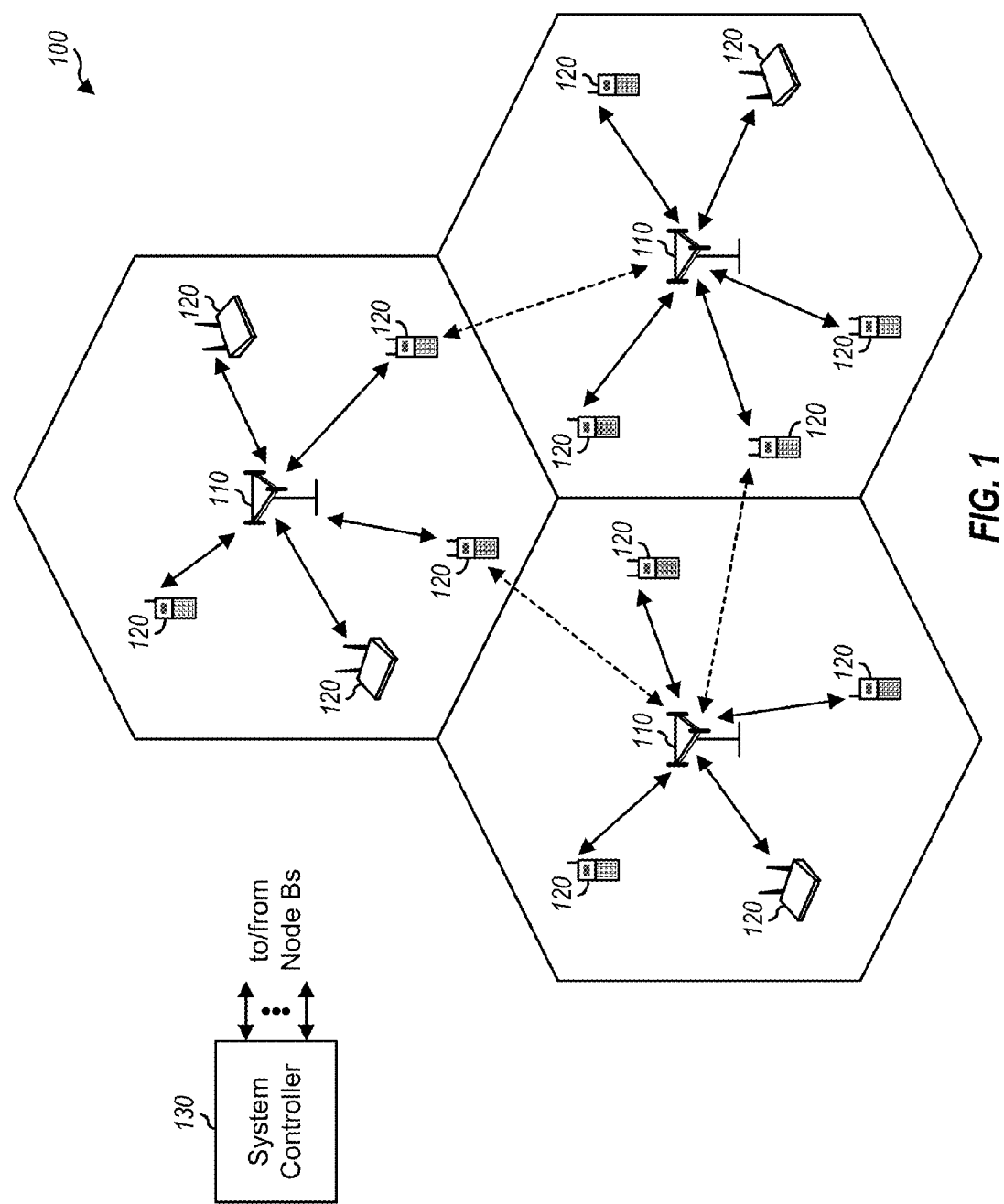
FIG. 1 shows a High Rate Packet Data (HRPD) communication system.

FIG. 1 shows an HRPD communication system 100 with multiple access points 110 and multiple terminals 120. An access point is generally a fixed station that communicates with the terminals and may also be referred to as a base station, a Node B, etc. Each access point 110 provides communication coverage for a particular geographic area and supports communication for the terminals located within the coverage area. Access points 110 may couple to a system controller 130 that provides coordination and control for these access points. System controller 130 may include network entities such as a Base Station Controller (BSC), a Packet Control Function (PCF), a Packet Data Serving Node (PDSN), etc.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless device, a handheld device, a wireless modem, a laptop computer, etc. A terminal may support any HRPD Revision. In HRPD, a terminal may receive a transmission on the forward link from one access point at any given moment and may send a transmission on the reverse link to one or more access points. The forward link (or downlink) refers to the communication link from the access points to the terminals, and the reverse link (or uplink) refers to the communication link from the terminals to the access points.

Figure 2:
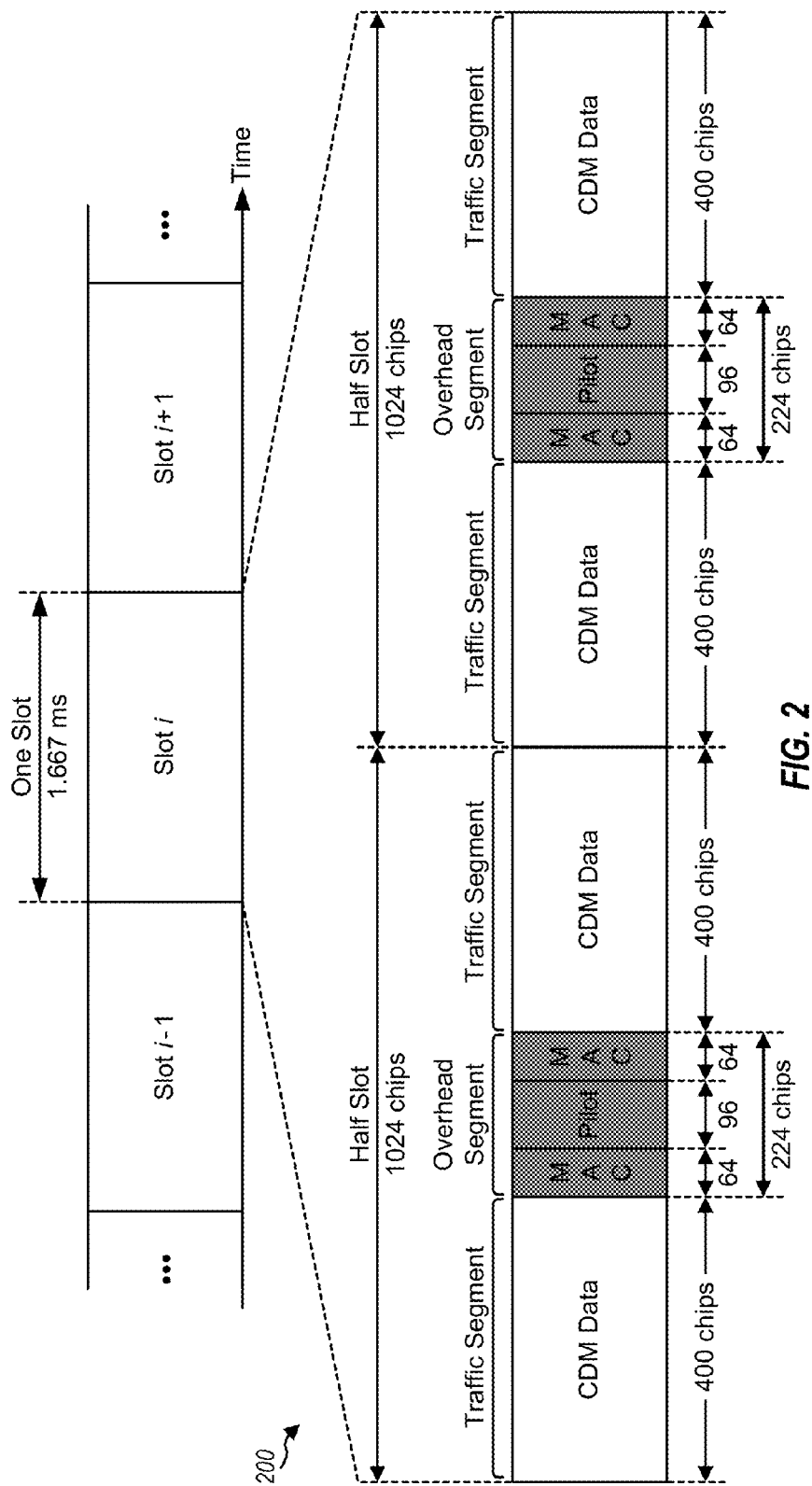
FIG. 2 shows a single-carrier slot structure that supports CDM.

FIG. 2 shows a single-carrier slot structure 200 that supports CDM on the forward link in HRPD. The transmission timeline is partitioned into slots. Each slot has a duration of 1.667 milliseconds (ms) and spans 2048 chips. Each chip has a duration of 813.8 nanoseconds (ns) for a chip rate of 1.2288 mega chips/second (Mcps). Each slot is divided into two identical half-slots. Each half-slot includes (i) an overhead segment composed of a pilot segment at the center of the half-slot and two Media Access Control (MAC) segments on both sides of the pilot segment and (ii) two traffic segments on both sides of the overhead segment. The traffic segments may also be referred to as traffic channel segments, data segments, data fields, etc. The pilot segment carries pilot and has a duration of 96 chips. Each MAC segment carries signaling (e.g., reverse power control (RPC) information) and has a duration of 64 chips. Each traffic segment carries traffic data (e.g., unicast data for specific terminals, broadcast data, etc.) and has a duration of 400 chips.

HRPD Revs. 0, A and B use CDM for data sent in the traffic segments. A traffic segment may carry CDM data for one or more terminals being served by an access point. The traffic data for each terminal may be processed based on coding and modulation parameters determined by channel feedback received from that terminal to generate data symbols. The data symbols for the one or more terminals may be demultiplexed and covered with 16-chip Walsh functions or codes to generate the CDM data for the traffic segment. The CDM data is thus generated in the time domain using Walsh functions. A CDM traffic segment is a traffic segment carrying CDM data.

It may be desirable to use OFDM and/or single-carrier frequency division multiplexing (SC-FDM) for data sent in the traffic segments. OFDM and SC-FDM partition the available bandwidth into multiple orthogonal subcarriers, which are also referred to as tones, bins, etc. Each subcarrier may be modulated with data. In general, modulation symbols are sent in the frequency domain with OFDM and in the time domain with SC-FDM. OFDM and SC-FDM have certain desirable characteristics such as the ability to readily combat intersymbol interference (ISI) caused by frequency selective fading. OFDM can also efficiently support MIMO and SDMA, which may be applied independently on each subcarrier and may thus provide good performance in a frequency selective channel. For clarity, the use of OFDM to send data is described below.

It may be desirable to support OFDM while retaining backward compatibility with HRPD Revs. 0, A and B. In HRPD, the pilot and MAC segments may be demodulated by all active terminals at all times whereas the traffic segments may be demodulated by only the terminals being served. Hence, backward compatibility may be achieved by retaining the pilot and MAC segments and modifying the traffic segments. OFDM data may be sent in an HRPD waveform by replacing the CDM data in a given 400-chip traffic segment with one or more OFDM symbols having a total duration of 400 chips or less.

FIG. 3A shows a single-carrier slot structure 300 that supports OFDM in HRPD. For simplicity, only one half-slot is shown in FIG. 3A. The half-slot includes (i) an overhead segment composed of a 96-chip pilot segment at the center of the half-slot and two 64-chip MAC segments on both sides of the pilot segment and (ii) two traffic segments on both sides of the overhead segment. In general, each traffic segment may carry one or more OFDM symbols. In the example shown in FIG. 3A, each traffic segment carries two OFDM symbols, and each OFDM symbol has a duration of 200 chips and is sent in one OFDM symbol period of 200 chips.

FIG. 3B shows a single-carrier slot structure 302 that supports CDM and OFDM in HRPD. A half-slot includes (i) an overhead segment composed of a 96-chip pilot segment and two 64-chip MAC segments and (ii) two traffic segments on both sides of the overhead segment. In one design, CDM or OFDM may be selected for each traffic segment. In this design, each traffic segment may carry CDM data if CDM is selected or one or more OFDM symbols if OFDM is selected. In other design, a traffic segment may carry both CDM data and OFDM data. For example, a traffic segment may carry CDM data in half of the traffic segment and one or more OFDM symbols in the other half of the traffic segment.

In general, OFDM symbols may be generated based on various OFDM symbol numerologies or designs. Each OFDM symbol numerology is associated with specific values for pertinent parameters such as OFDM symbol duration, number of subcarriers, cyclic prefix length, etc. The OFDM symbol duration should be an integer divisor of the 400-chip traffic segment in order to fully utilize the traffic segment. Furthermore, the sample rate for the OFDM symbols should be an integer multiple of the chip rate for the CDM data in order to simplify processing at the access points and terminals.

Table 1 lists three example OFDM symbol numerologies for HRPD. These numerologies are selected to be compatible with HRPD slot structure and chip rate so that (i) an integer number of OFDM symbols is sent in a traffic segment and (ii) the sample rate for the OFDM symbols is an integer multiple of the chip rate for the CDM data. The numerologies are further selected such that the total number of subcarriers, which determines a discrete Fourier transform (DFT) size, allow for efficient generation of the OFDM symbols. For these numerologies, the total number of subcarriers is not a power of 2 but has small prime factors. For example, 90 subcarriers may be obtained with prime factors of 2, 3, 3 and 5. The small prime factors may allow for efficient mixed-radix fast Fourier transform (FFT) implementations to generate the OFDM symbols. The numerologies shown in Table 1 allow for efficient embedding of OFDM data in an HRPD waveform.

TABLE 1

| Parameter | Normal OFDM Symbol Numerology 1 | Normal OFDM Symbol Numerology 2 | Normal OFDM Symbol Numerology 3 | Unit |
|---|---|---|---|---|
| Sample rate | $1.2288 \times n$ | $1.2288 \times n$ | $1.2288 \times n$ | Msps |
| Number of subcarriers | $90 \times n$ | $180 \times n$ | $360 \times n$ | |
| Subcarrier spacing | 13.65333... | 6.82666... | 3.41333... | KHz |
| Useful portion | 90 ($73.2421875\ \mu s$) | 180 ($146.484375\ \mu s$) | 360 ($292.96875\ \mu s$) | chips |
| Cyclic prefix length | 7.5 ($\approx 6.10\ \mu s$) | 16 ($\approx 13.02\ \mu s$) | 36 ($\approx 29.30\ \mu s$) | chips |
| Guard time for windowing | 2.5 ($\approx 2.03\ \mu s$) | 4 ($\approx 3.26\ \mu s$) | 4 ($\approx 3.26\ \mu s$) | chips |
| OFDM symbol duration | 100 ($\approx 81.38\ \mu s$) | 200 ($\approx 162.76\ \mu s$) | 400 ($\approx 325.52\ \mu s$) | chips |

Any of the OFDM symbol numerologies in Table 1 may be used to replace CDM data with OFDM data in a traffic segment. These OFDM symbol numerologies provide different tradeoffs with respect to Doppler spread and multipath delay tolerance. Numerology 1 has the largest subcarrier spacing and the shortest cyclic prefix as compared to numerologies 2 and 3. Hence, numerology 1 may provide better Doppler tolerance (due to the larger subcarrier spacing) and may enable high spectral efficiency in high-speed vehicular channels at the expense of lower delay tolerance (due to the shorter cyclic prefix). Numerology 3 has the smallest subcarrier spacing and the longest cyclic prefix as compared to numerologies 1 and 2. Hence, numerology 3 may provide lower Doppler tolerance (due to the smaller subcarrier spacing) but higher delay tolerance (due to the longer cyclic prefix), which may enable high spectral efficiency in the presence of large multipath delays such as those induced by repeaters.

Other OFDM symbol numerologies may also be used for the traffic segments. In general, the OFDM symbol numerologies may be selected such that (i) the OFDM symbol duration and sample rate are compatible with the HRPD slot format and chip rate, respectively, and (ii) the DFT size allows for efficient OFDM symbol generation. This may then allow for replacement of CDM data in the HRPD forward link waveform with OFDM data in an efficient and backward compatible manner. CDM data may be selectively replaced with OFDM data in each traffic segment. Overhead segments may be retained for backward compatibility.

In one design, a fixed OFDM symbol numerology is used for all traffic segments carrying OFDM data. The terminals may know this OFDM symbol numerology a priori and may be able to demodulate the OFDM data without any signaling on numerology.

In another design, configurable OFDM symbol numerology may be used for a given traffic segment carrying OFDM data. A set of numerologies (e.g., those listed in Table 1) may be supported. Different numerologies may be used for different terminals. A suitable numerology may be selected for each terminal based on the channel conditions of that terminal. For example, numerology 1 may be used for a terminal traveling at high speed, numerology 3 may be used for a terminal with large multipath delay spread, and numerology 2 may be used for a terminal with moderate speed and/or moderate multipath delay spread.

Figure 4:
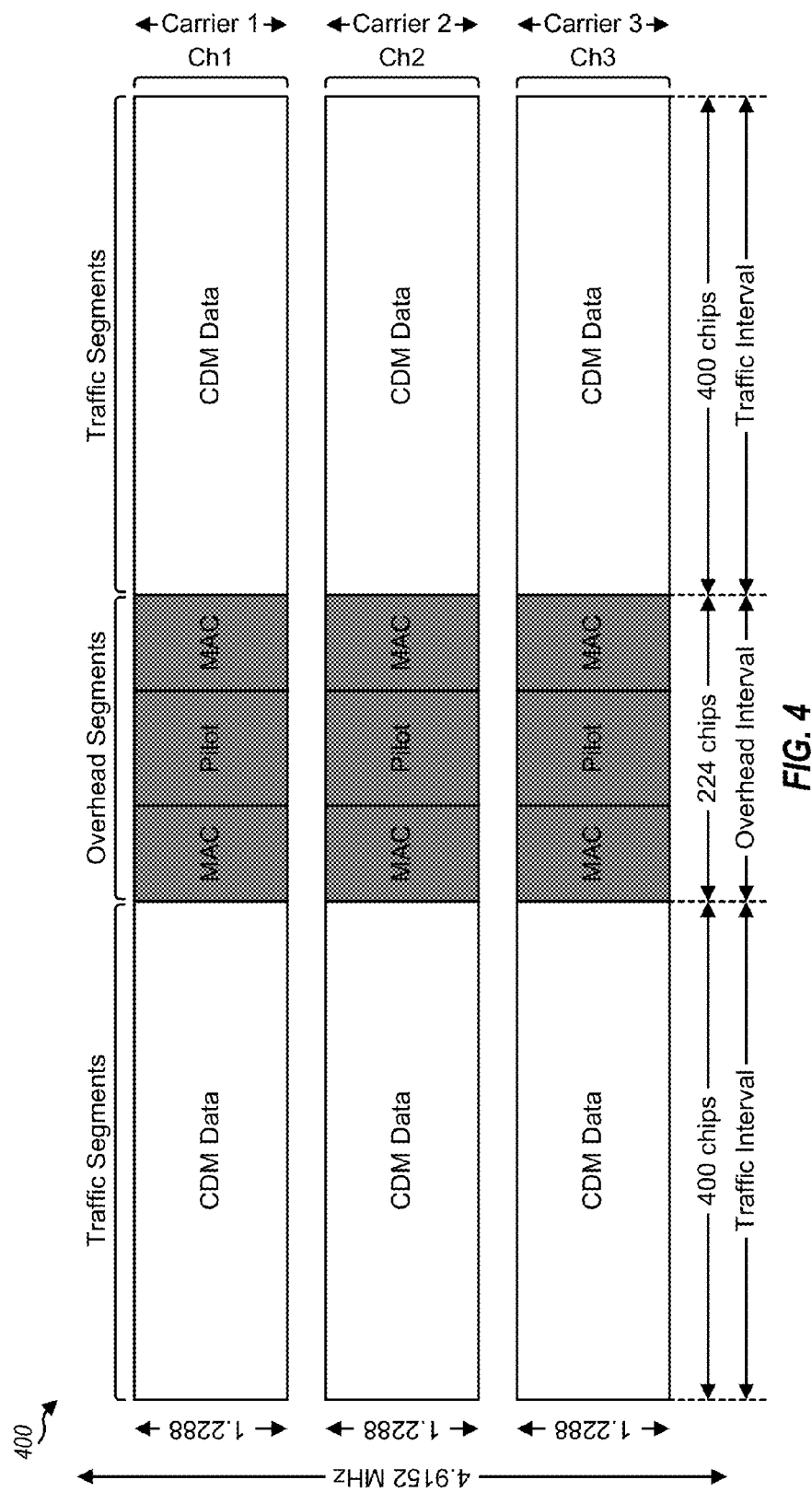
FIG. 4 shows a multi-carrier slot structure that supports CDM.

FIG. 4 shows a multi-carrier slot structure 400 that supports CDM in HRPD. In HRPD Rev. B, multiple 1xHRPD waveforms may be multiplexed in the frequency domain to obtain a multi-carrier HRPD waveform that fills a given spectral allocation. In the example show in FIG. 4, three 1xHRPD waveforms for three HRPD carriers 1, 2 and 3 are frequency multiplexed in a 5 MHz spectral allocation. Each 1xHRPD waveform is generated for a different carrier and occupies approximately 1.25 MHz. The three 1xHRPD waveforms occupy approximately 3×1.25=3.75 MHz, which may leave relatively large guard bands at both edges of the 5 MHz spectral allocation. The spacing between adjacent carriers is not specified in HRPD but is typically selected to provide a small transition band between adjacent 1xHRPD waveforms.

As shown in FIG. 4, the multi-carrier HRPD waveform includes three overhead segments and six traffic segments for the three carriers in each half-slot. Each traffic segment may carry CDM data, as shown in FIG. 4. The CDM data in each traffic segment in the multi-carrier HRPD waveform may be selectively replaced with OFDM data. Furthermore, the traffic and overhead segments in the multi-carrier HRPD waveform may be arranged to efficiently utilize the spectral allocation.

Figure 5:
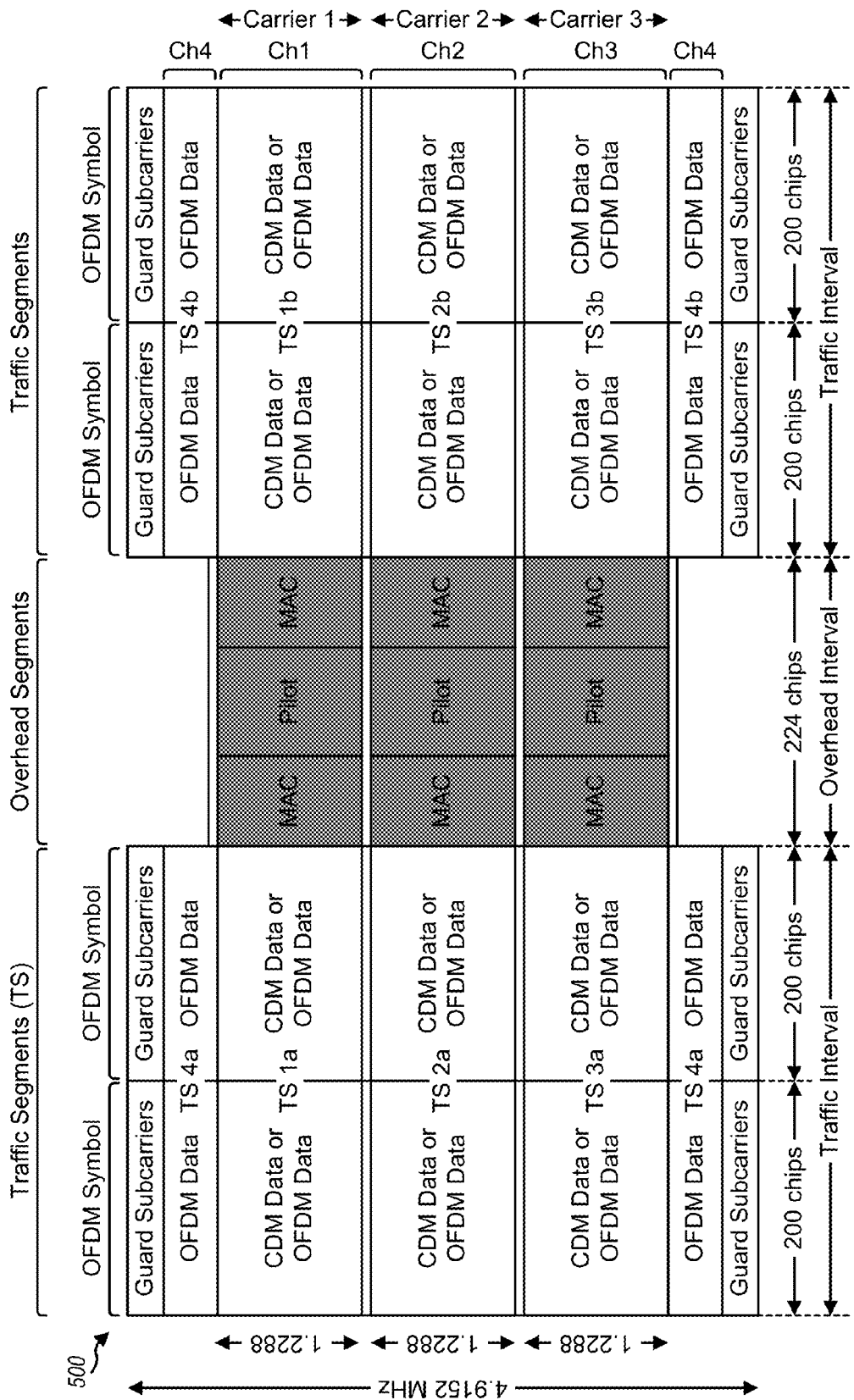
FIG. 5 shows a multi-carrier slot structure that supports CDM and OFDM.

FIG. 5 shows a multi-carrier slot structure 500 that supports CDM and OFDM in HRPD. In the example shown in FIG. 5, three HRPD carriers are sent in a 5 MHz spectral allocation and are spaced as close as possible in order to improve bandwidth utilization. For each HRPD carrier, each half-slot includes (i) an overhead segment composed of the pilot and MAC segments and (ii) two traffic segments on both sides of the overhead segment. HRPD carrier 1 includes traffic segments (TS) 1a and 1b to the left and right of the overhead segment, HRPD carrier 2 includes traffic segments 2a and 2b to the left and right of the overhead segment, and HRPD carrier 3 includes traffic segments 3a and 3b to the left and right of the overhead segment. Each traffic segment for each HRPD carrier may carry CDM data or OFDM data.

It is customary to deploy at most three HRPD carriers (each spanning roughly 1.25 MHz) in a 5 MHz spectral allocation. It is not practical to accommodate a fourth HRPD carrier in the 5 MHz spectral allocation, because this would leave too small a guard band between the HRPD system and an incompatible system that may be deployed outside the 5 MHz allocation. On the other hand, with three HRPD carriers, only about 3.75 MHz of the 5 MHz spectral allocation is actually utilized by the system, implying a guard band of roughly 1.25 MHz. This guard band size may be too large in some cases, which means the multi-carrier system is inefficient in its usage of the available spectrum. This limitation may be overcome by extending the techniques described above. For 3-carrier HRPD in 5 MHz spectral allocation, OFDM symbols may be generated at a sample rate of 4×1.2288=4.9152 Mcps for n=4, as shown in FIG. 5. The OFDM symbols may then occupy most of the 5 MHz spectral allocation. Alternatively, the OFDM symbols may be generated at a sample rate of 3×1.2288=3.6864 Mcps for n=3, which is not shown in FIG. 5.

An OFDM symbol may be generated for each OFDM symbol period in a traffic interval. Each OFDM symbol period is 200 chips with OFDM symbol numerology 2 in Table 1. An OFDM symbol may carry OFDM data on (i) subcarriers corresponding to traffic segments used for OFDM and (ii) remaining usable subcarriers at both edges of the spectral allocation. The OFDM symbol may also be nulled out on subcarriers corresponding to traffic segments with CDM data. The OFDM symbol may thus carry OFDM data that may selectively replace CDM data in zero or more traffic segments for zero or more HRPD carriers. OFDM allows for better utilization of the available spectrum in the 5 MHz spectral allocation.

The spacing between HRPD carriers may be selected based on various factors such as a pulse shaping filter used for CDM, the manner in which CDM data and/or OFDM data is generated, etc. Guard subcarriers, which are subcarriers with no transmission, may be used at both edges of the spectral allocation. The number of guard subcarriers at the band edges may be selected based on spurious emission requirements and/or other factors.

Figure 6:
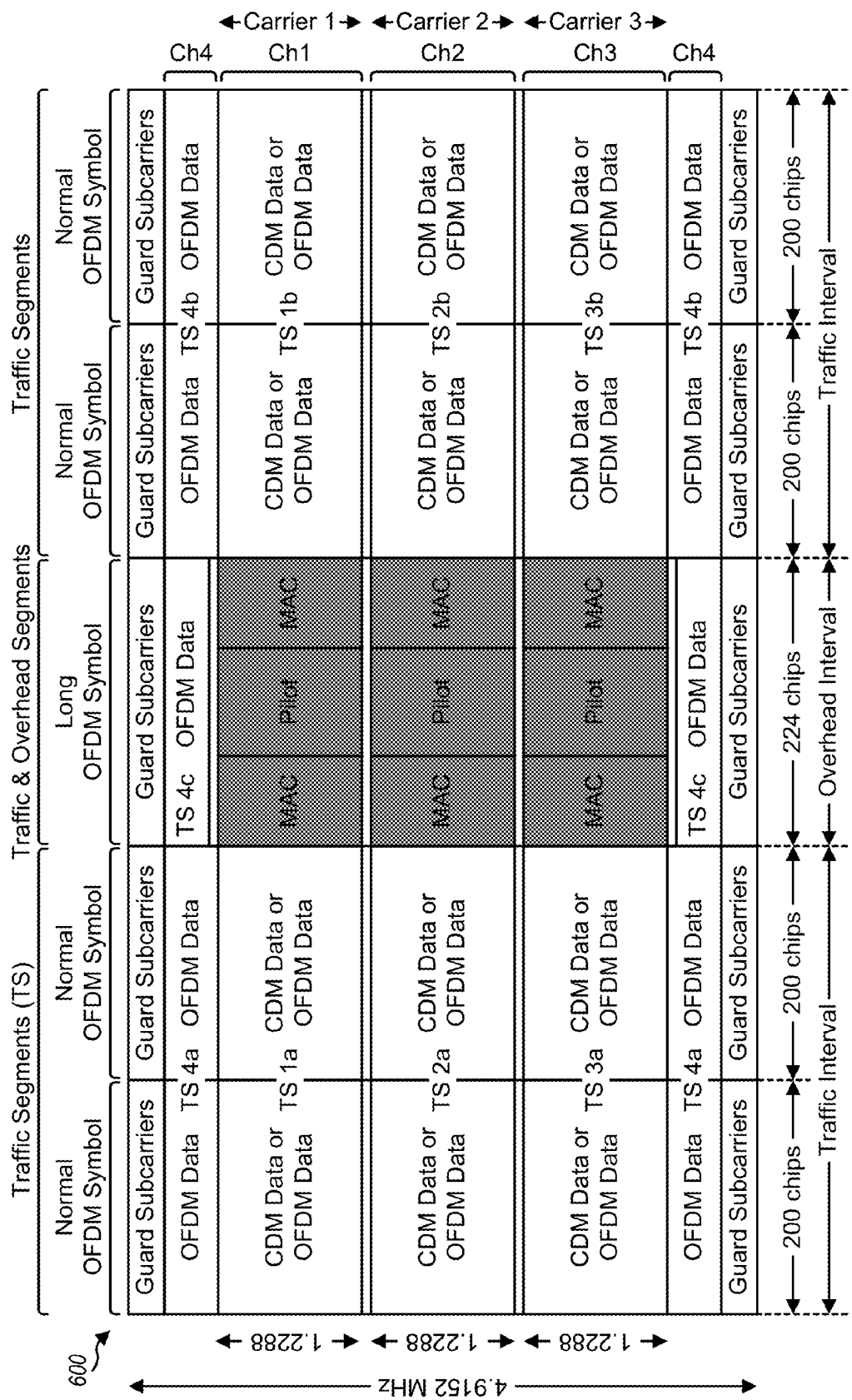
FIG. 6 shows another multi-carrier slot structure that supports CDM and OFDM.

FIG. 6 shows a multi-carrier slot structure 600 that supports CDM and OFDM in HRPD and more fully utilize the available bandwidth. Slot structure 600 includes all of the traffic and overhead segments in slot structure 500 in FIG. 5. Slot structure 600 further includes OFDM data in spectral portions that are not used for the pilot or MAC segments in the 224-chip overhead interval.

Additional OFDM symbol numerologies may be defined for the 224-chip overhead interval covering the pilot and MAC segments. These numerologies may be selected such that (i) an integer number of OFDM symbols may be sent in the overhead interval and (ii) the sample rate for the OFDM symbols is an integer multiple of the chip rate. Table 2 lists two example OFDM symbol numerologies for the overhead interval. The OFDM symbols sent in the overhead interval are referred to as "long" OFDM symbols because their durations are longer than the durations of the "normal" OFDM symbols sent in the traffic intervals with the corresponding numerologies in Table 1.

TABLE 2

| Parameter | Long OFDM Symbol Numerology 1 | Long OFDM Symbol Numerology 2 | Unit |
| --- | --- | --- | --- |
| Sample rate | 1.2288 × n | 1.2288 × n | Msps |
| Number of subcarriers | 100 × n | 200 × n | |
| Subcarrier spacing | 12.288... | 6.144... | KHz |
| Useful portion | 100 ($\approx$81.38 µs) | 200 ($\approx$162.76 µs) | chips |
| Cyclic prefix length | 8 ($\approx$6.51 µs) | 20 ($\approx$16.28 µs) | chips |
| Guard time for windowing | 4 ($\approx$3.26 µs) | 4 ($\approx$3.26 µs) | chips |
| OFDM symbol duration | 112 ($\approx$91.15 µs) | 224 ($\approx$182.29 µs) | chips |

Other OFDM symbol numerologies may also be used for the overhead interval. In general, the OFDM symbol numerologies may be selected such that (i) the OFDM symbol duration and sample rate are compatible with the HRPD slot format and chip rate, respectively, and (ii) the DFT size allows for efficient OFDM symbol generation.

An OFDM symbol may be generated for each OFDM symbol period in the overhead interval as described below. The OFDM symbol may carry OFDM data in subcarriers corresponding to the portions of the bandwidth that are not used for the pilot and MAC segments. The OFDM symbol may be nulled out on subcarriers corresponding to the pilot and MAC segments. Overall spectral utilization may be improved by using one or more long OFDM symbols in the overhead interval.

In the designs shown in FIGS. 5 and 6, four logical channels Ch1, Ch2, Ch3 and Ch4 may be defined for the traffic segments. These logical channels may also be referred to as data channels, traffic channels, etc. Logical channel Ch1 may include traffic segments 1a and 1b sent on HRPD carrier 1, logical channel Ch2 may include traffic segments 2a and 2b sent on HRPD carrier 2, logical channel Ch3 may include traffic segments 3a and 3b sent on HRPD carrier 3, and logical channel Ch4 may include traffic segments 4a, 4b and 4c sent on the remaining usable spectrum. Logical channels Ch1, Ch2 and Ch3 thus correspond to subcarriers that overlap with HRPD carriers 1, 2 and 3, respectively. Logical channels Ch1, Ch2 and Ch3 may switch between CDM and OFDM in each slot, each half-slot, etc. Logical channel Ch4 has no associated HRPD carrier and may be used to improve bandwidth utilization. Logical channel Ch4 may also be partitioned into two logical subchannels, e.g., a lower Ch4 and an upper Ch4, with each logical subchannel including a contiguous set of subcarriers. The logical channels may be scheduled independently. For example, each logical channel may be scheduled based on channel quality feedback received from the terminals for that logical channel.

In general, any number of HRPD carriers may be sent in a given spectral allocation. For each HRPD carrier, each traffic segment may carry CDM data or OFDM data. OFDM data may also be sent in remaining usable spectrum not used by the HRPD carriers.

Figure 7:
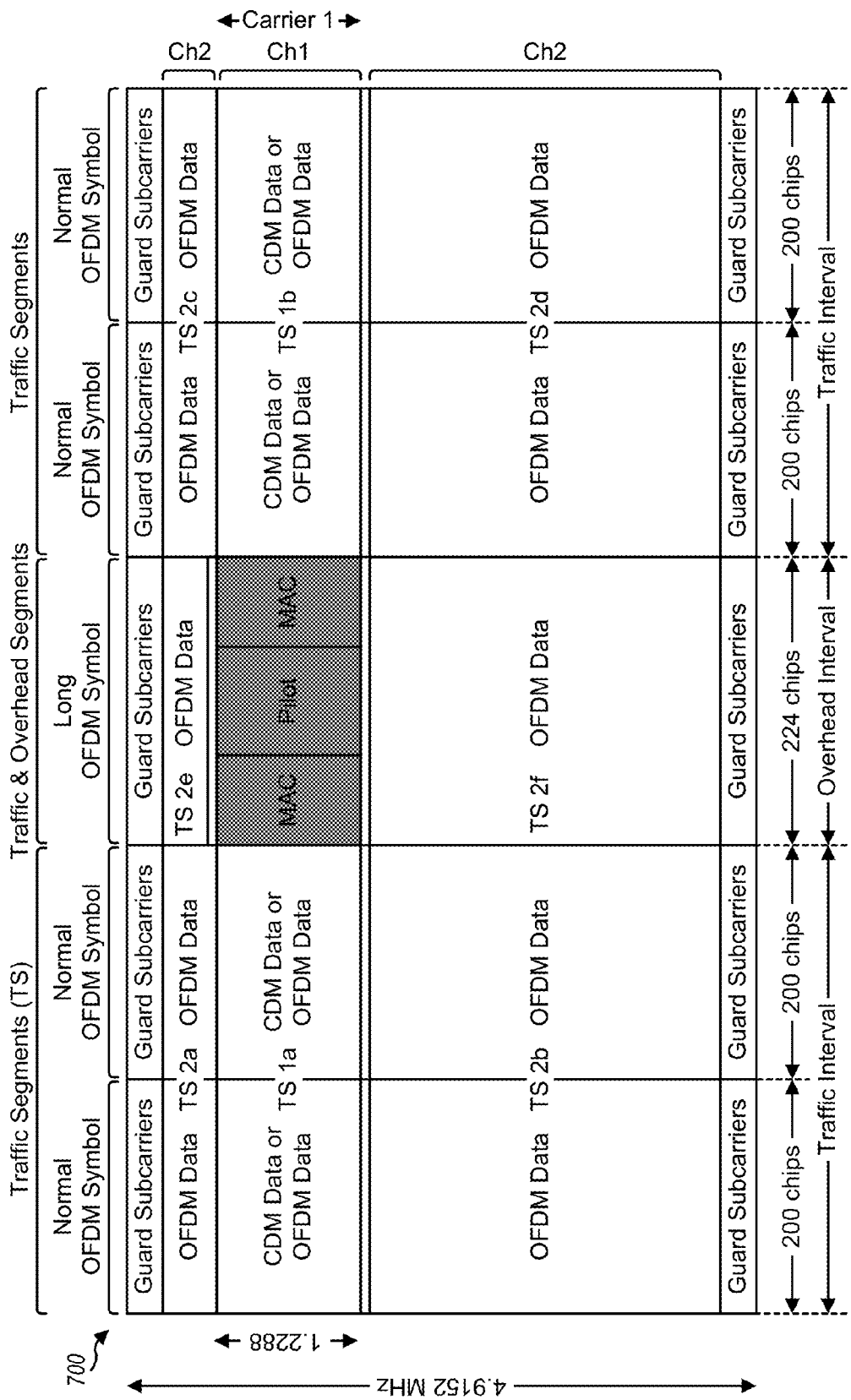
FIG. 7 shows a slot structure that supports OFDM and CDM.

FIG. 7 shows a slot structure 700 that supports OFDM and CDM for a single HRPD carrier in a 5 MHz spectral allocation. In the example shown in FIG. 7, the single HRPD carrier is located near one edge of the 5 MHz spectral allocation. The pilot and MAC segments for the HRPD carrier are generated and sent in the center of the half-slot, as described above in FIGS. 2 through 6. Each traffic segment of the HRPD carrier may carry CDM data or OFDM data.

An OFDM spectrum may be defined to include all usable spectrum in the spectral allocation except for the HRPD carrier. In the example shown in FIG. 7, the OFDM spectrum includes the usable spectrum on both sides of the HRPD carrier. The normal and long OFDM symbols may be expanded and used to carry data in the OFDM spectrum. Traffic data, signaling and pilot may be sent in the OFDM spectrum in any manner, e.g., using any techniques commonly used in systems employing just OFDM or OFDMA. For example, pilot and signaling may be sent in any manner on any subcarriers and symbol periods. The available subcarriers and symbol periods may also be allocated to any number of terminals, and data may be sent to the scheduled terminals in any manner.

In the design shown in FIG. 7, two logical channels Ch1 and Ch2 are defined. Logical channel Ch1 includes traffic segments 1a and 1b sent on HRPD carrier 1, and logical channel Ch2 includes traffic segments 2a through 2f sent on the OFDM spectrum. Logical channel Ch1 may switch between CDM and OFDM in each slot, each half-slot, etc. Logical channel Ch2 is not bound to any HRPD carrier and may be operated in a pure OFDM mode to carry just OFDM data. Traffic data, signaling, and/or pilot may be sent with OFDM in any manner on logical channel Ch2.

Figure 8:
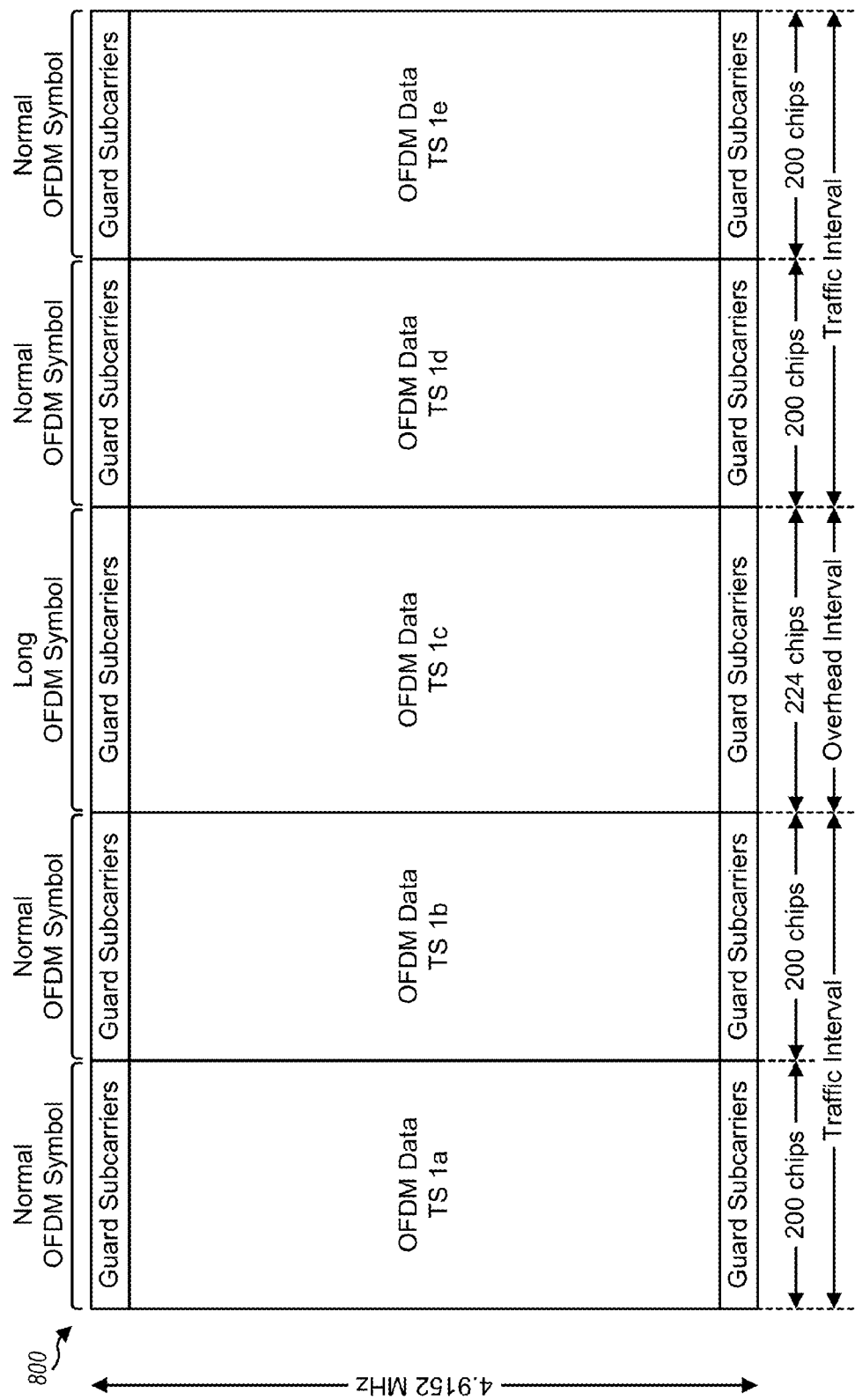
FIG. 8 shows a slot structure that supports OFDM in a 5 MHz spectral allocation.

FIG. 8 shows an HRPD slot structure 800 that supports OFDM in a 5 MHz spectral allocation. In the example shown in FIG. 8, the spectral allocation contains no HRPD carrier. The normal and long OFDM symbols may be used to send data in the entire available spectrum, except for the guard subbands at the band edges. Logical channel Ch1 may be defined to cover the entire usable spectrum. Logical channel Ch1 may be operated as if it is for an OFDM/OFDMA system and may incorporate design elements from other OFDM/OFDMA technologies such as Flash OFDM®, IEEE 802.20, LTE, etc. The time frequency resources in logical channel Ch1 may be partitioned into traffic resources used for traffic data, signaling resources used for signaling, pilot resources used for pilot, etc. The signaling resources may be used to schedule terminals and to assign traffic resources to the scheduled terminals. The signaling resources may also be used to facilitate hybrid automatic retransmission (H-ARQ) feedback, power control, etc. Various structural elements and physical layer features of Flash-OFDM®, IEEE 802.20, LTE and/or other OFDM/OFDMA systems may be employed for logical channel Ch1.

Figure 9:
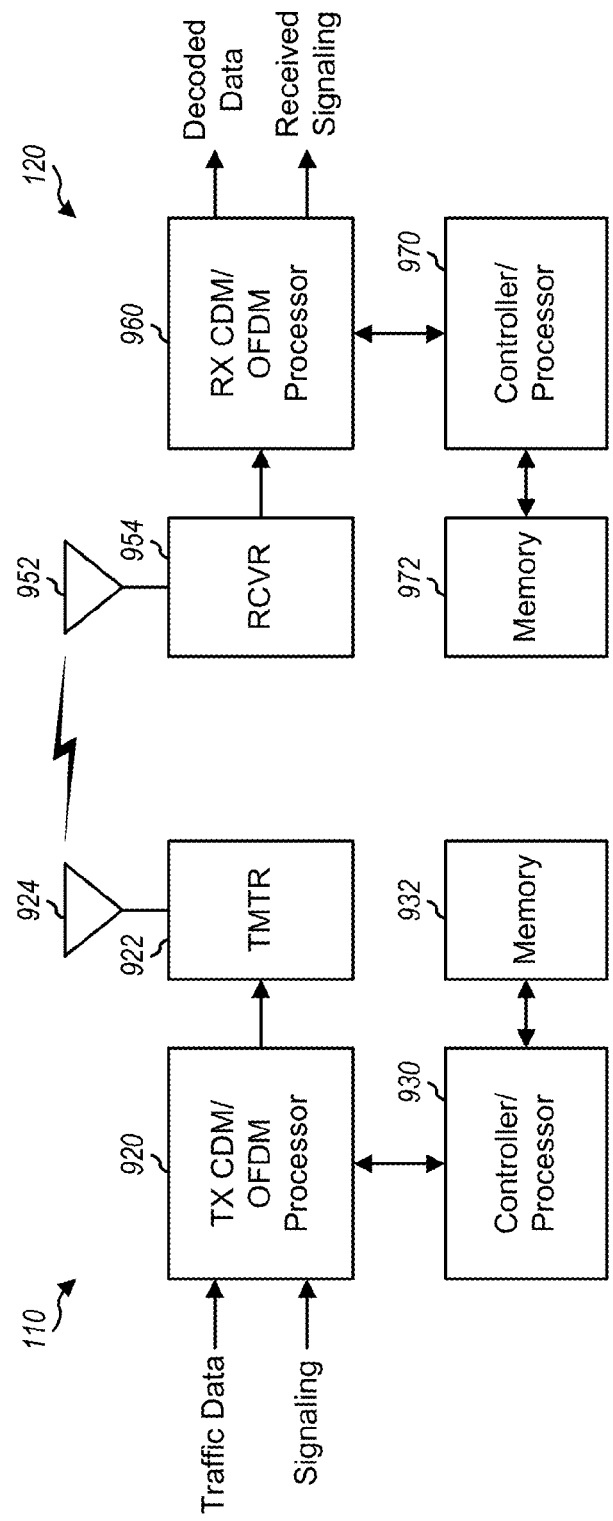
FIG. 9 shows a block diagram of an access point and a terminal.

FIG. 9 shows a block diagram of a design of an access point 110 and a terminal 120, which are one of the access points and terminals in FIG. 1. For simplicity, only processing units for transmission on the forward link are shown in FIG. 9.

At access point 110, a TX CDM/OFDM processor 920 receives and processes traffic data and signaling as described below and provides output samples. A transmitter (TMTR) 922 processes (e.g., converts to analog, amplifies, filters, and frequency upconverts) the output samples and generates a forward link signal, which is transmitted via an antenna 924. At terminal 120, an antenna 952 receives the forward link signal from access point 110 and provides a received signal to a receiver (RCVR) 954. Receiver 954 processes (e.g., filters, amplifies, frequency downconverts, and digitizes) the received signal and provides received samples. An RX CDM/OFDM processor 960 processes the received samples in a manner complementary to the processing by TX CDM/OFDM processor 920, as described below, and provides decoded data and received signaling for terminal 120.

Controllers 930 and 970 direct the operation at access point 110 and terminal 120, respectively. Memories 932 and 972 store program codes and data for access point 110 and terminal 120, respectively.

Figure 10:
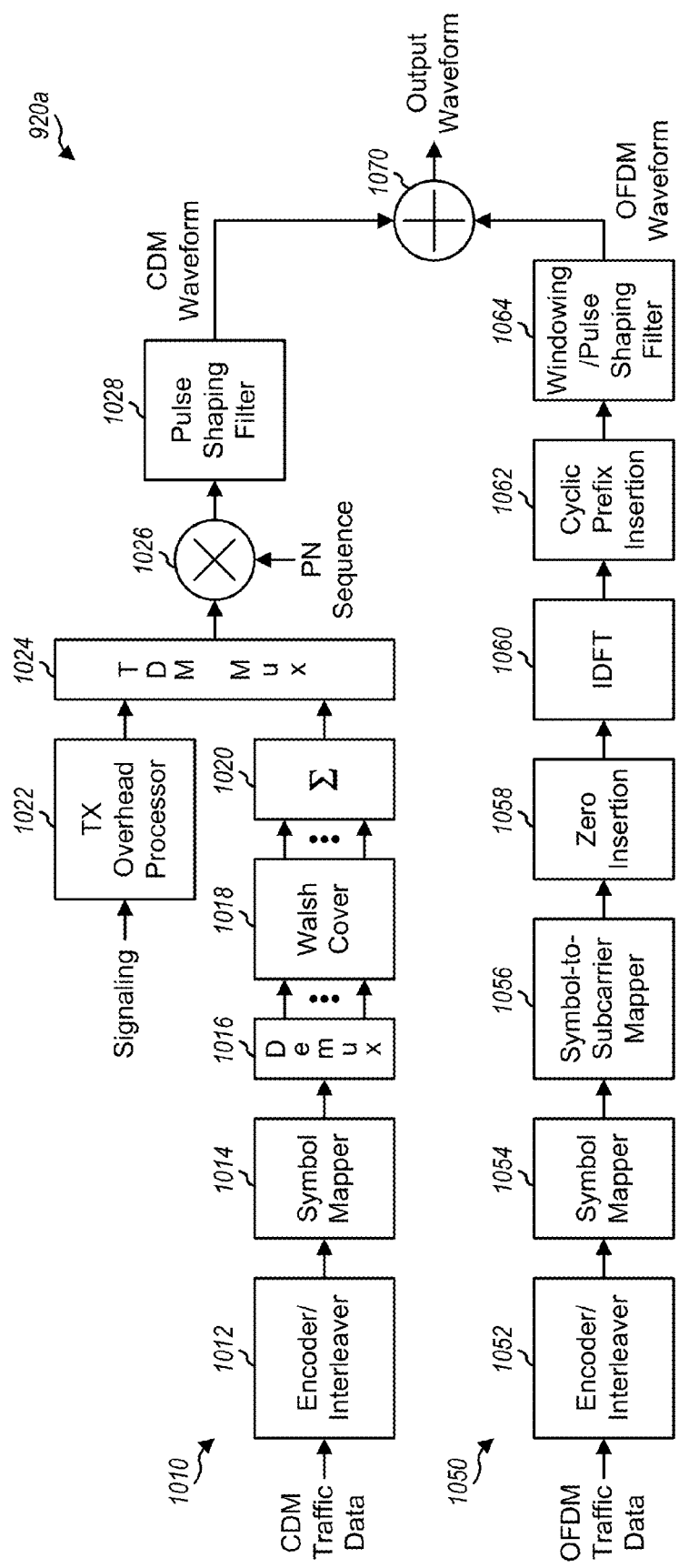
FIG. 10 shows a design of a transmit (TX) CDM/OFDM processor.

FIG. 10 shows a block diagram of a TX CDM/OFDM processor 920a, which is one design of TX CDM/OFDM processor 920 in FIG. 1. Processor 920a includes (i) a CDM processor 1010 that generates a CDM waveform carrying CDM data and overhead data and (ii) an OFDM processor 1050 that generates an OFDM waveform carrying OFDM data.

Within CDM processor 1010, an encoder/interleaver 1012 receives traffic data to be sent using CDM, encodes the traffic data based on a coding scheme, and interleaves (or reorders) the coded data. A symbol mapper 1014 maps the interleaved data to data symbols based on a modulation scheme. A demultiplexer (Demux) 1016 demultiplexes the data symbols into multiple (e.g., 16) streams. A Walsh cover unit 1018 covers or channelizes each data symbol stream with a different 16-chip Walsh code to obtain a corresponding data chip stream. A summer 1020 sums multiple (e.g., 16) data chip streams for multiple Walsh codes and provides CDM data at the chip rate. A TX overhead processor 1022 receives signaling for the MAC segments and pilot data for the pilot segment and generates overhead data at the chip rate for the overhead segment.

A TDM multiplexer (Mux) 1024 receives the CDM data from summer 1020 and the overhead data from processor 1022, provides the CDM data in traffic segments carrying CDM data, and provides the overhead data in overhead segments. A multiplier 1026 multiplies the output of TDM multiplexer 1024 with a pseudo-noise (PN) sequence for the access point and provides output chips at the chip rate. A pulse shaping filter 1028 filters the output chips and provides a CDM waveform for one HRPD carrier. Multiple CDM waveforms for multiple HRPD carriers may be generated with multiple instances of CDM processor 1010. These multiple CDM waveforms may be upconverted to the proper frequencies in the digital domain or the analog domain.

Within OFDM processor 1050, an encoder/interleaver 1052 receives traffic data to be sent using OFDM, encodes the traffic data based on a coding scheme, and interleaves the coded data. A symbol mapper 1054 maps the interleaved data to data symbols. A symbol-to-subcarrier mapper 1056 maps the data symbols to subcarriers used for OFDM. A zero insertion unit 1058 inserts zero symbols (which have signal value of zero) on subcarriers not used for OFDM, e.g., subcarriers corresponding to CDM traffic segments and overhead segments, null subcarriers, and guard subcarriers. An inverse discrete Fourier transform (IDFT) unit 1060 performs a K-point IDFT on the data symbols and zero symbols for K total subcarriers in each OFDM symbol period and provides a useful portion containing K time-domain samples. K is dependent on OFDM symbol numerology and is given in Tables 1 and 2 for the normal and long OFDM symbols. A cyclic prefix insertion unit 1062 copies the last C samples of the useful portion and appends these C samples to the front of the useful portion to form an OFDM symbol containing K+C samples at the sample rate. The sample rate may be n times the chip rate, where n may be equal to 1, 2, 3, 4, etc. The repeated portion is referred to as a cyclic prefix and is used to combat ISI caused by frequency selective fading. A windowing/pulse shaping filter 1028 windows and filters the samples from unit 1062 and provides an OFDM waveform. A summer 1070 sums the CDM waveform from CDM processor 1010 and the OFDM waveform from OFDM processor 1050 and provides an output waveform.

Figure 11:
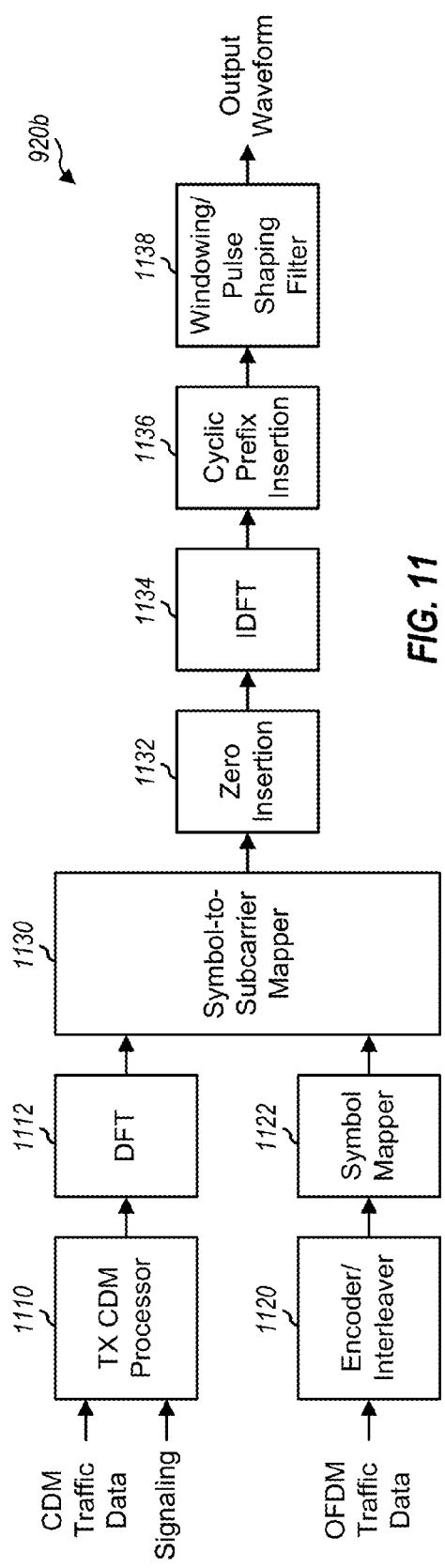
FIG. 11 shows another design of a TX CDM/OFDM processor.

FIG. 11 shows a block diagram of a TX CDM/OFDM processor 920*b*, which is another design of TX CDM/OFDM processor 920 in FIG. 1. Processor 920*b* maps CDM data to subcarriers used for CDM and maps OFDM data to subcarriers used for OFDM. Processor 920*b* then generates an output waveform based on the mapped CDM data and OFDM data.

Within processor 920*b*, a TX CDM processor 1110 receives and processes traffic data to be sent using CDM, signaling, and pilot and provides output chips. Processor 1110 may include units 1012 through 1026 in FIG. 10. A DFT unit 1112 performs an L-point DFT on the output chips in each OFDM symbol period and provides L frequency-domain symbols for L subcarriers. L is the number of subcarriers corresponding to an HRPD carrier and may be dependent on the OFDM symbol numerology.

An encoder/interleaver 1120 and a symbol mapper 1122 process traffic data to be sent using OFDM and provides data symbols. A symbol-to-subcarrier mapper 1130 maps the frequency-domain symbols from DFT unit 1112 to subcarriers used for CDM and further maps the data symbols from symbol mapper 1122 to subcarriers used for OFDM. A zero insertion unit 1132 inserts zero symbols on subcarriers not used for CDM or OFDM, e.g., null and guard subcarriers. An IDFT unit 1134 performs a K-point IDFT on K symbols for each OFDM symbol period and provides a useful portion containing K time-domain samples. A cyclic prefix insertion unit 1136 inserts a cyclic prefix to the useful portion and provides an OFDM symbol containing K+C samples at the sample rate. A windowing/pulse shaping filter 1138 windows and filters the samples from unit 1136 and provides an output waveform. Filter 1136 may provide sharper spectral roll-off than filter 1028 in FIG. 10, which may allow for better utilization of the spectral allocation.

Figure 12:
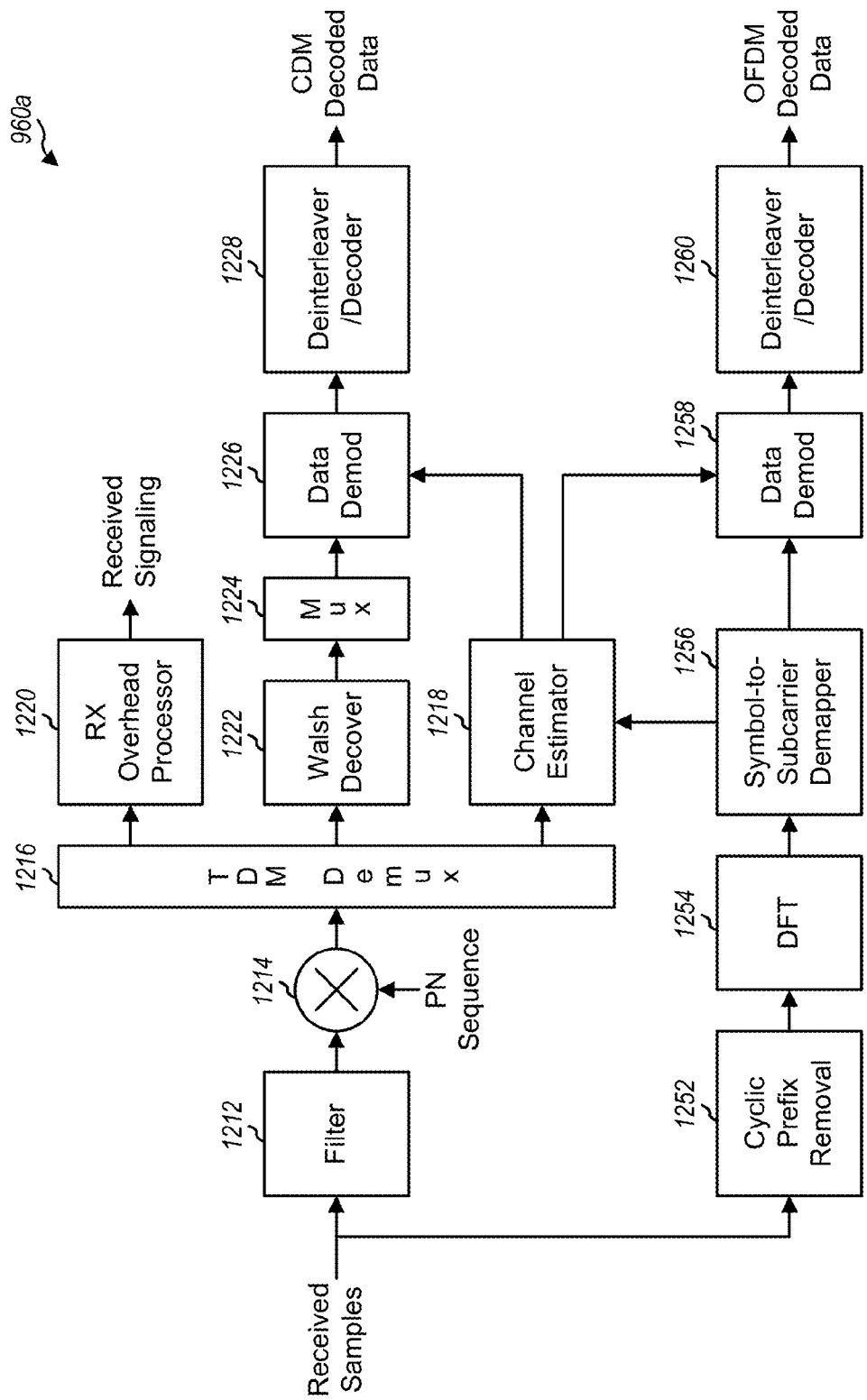
FIG. 12 shows a design of a receive (RX) CDM/OFDM processor.

FIG. 12 shows a block diagram of an RX CDM/OFDM processor 960*a*, which is one design of RX CDM/OFDM processor 960 in FIG. 9. Processor 960*a* may be used to receive the output waveform generated by TX CDM/OFDM processor 920*a* in FIG. 10.

To recover CDM data, a filter 1212 obtains received samples from receiver 954, filters the received samples to remove spectral components outside of an HRPD carrier of interest, performs conversion from sample rate to chip rate, and provides filtered chips. A multiplier 1214 multiplies the filtered chips with the PN sequence used by the access point and provides input chips. A TDM demultiplexer 1216 provides input chips for the pilot segment to a channel estimator 1218, provides input chips for the MAC segments to an RX overhead processor 1220, and provides input chips for traffic segments carrying CDM data to a Walsh decover unit 1222. Channel estimator 1218 derives a channel estimate based on the received pilot. Unit 1222 decovers or dechannelizes the input samples for each Walsh code used for the CDM data and provides received symbols. A multiplexer 1224 multiplexes the received symbols for all Walsh codes. A data demodulator (Demod) 1226 performs coherent detection on the received symbols with the channel estimate and provides data symbol estimates, which are estimates of the data symbols sent with CDM. A deinterleaver/decoder 1228 deinterleaves and decodes the data symbol estimates and provides decoded data for CDM. RX overhead processor 1220 processes the input chips for the MAC segments and provides received signaling.

To recover OFDM data, a cyclic prefix removal unit 1252 obtains K+C received samples in each OFDM symbol period, removes the cyclic prefix, and provides K received samples for the useful portion. A DFT unit 1254 performs a K-point DFT on the K received samples and provides K received symbols for the K total subcarriers. A symbol-to-subcarrier demapper 1256 obtains the received symbols for the K total subcarriers, provides received data symbols for the subcarriers used for OFDM to a data demodulator 1258, and may provide received pilot symbols to channel estimator 1218. Data demodulator 1258 performs data detection (e.g., matched filtering, equalization, etc.) on the received data symbols with the channel estimate from channel estimator 1218 and provides data symbol estimates, which are estimates of the data symbols sent with OFDM. A deinterleaver/decoder 1260 deinterleaves and decodes the data symbol estimates and provides decoded data for OFDM.

Figure 13:
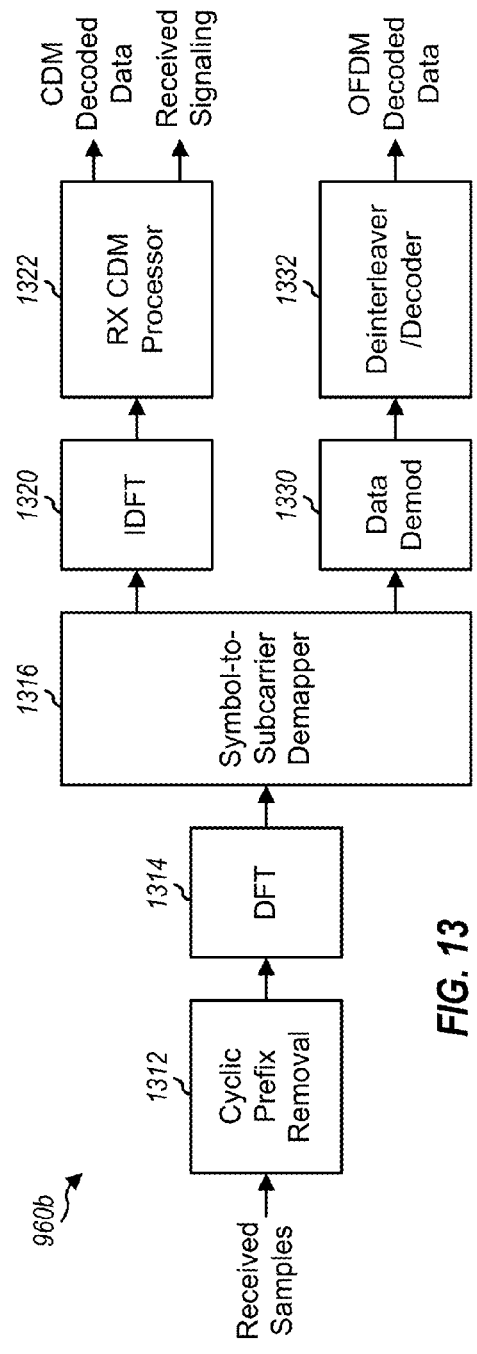
FIG. 13 shows another design of an RX CDM/OFDM processor.

FIG. 13 shows a block diagram of an RX CDM/OFDM processor 960*b*, which is another design of RX CDM/OFDM processor 960 in FIG. 9. Processor 960*b* may be used to receive the output waveform generated by TX CDM/OFDM processor 920*b* in FIG. 11. Within processor 960*b*, a cyclic prefix removal unit 1312 obtains K+C received samples in each OFDM symbol period, removes the cyclic prefix, and provides K received samples for the useful portion. A DFT unit 1314 performs a K-point DFT on the K received samples and provides K received symbols for the K total subcarriers. A symbol-to-subcarrier demapper 1316 obtains the received symbols for the K total subcarriers, provides received symbols for subcarriers used for CDM to an IDFT unit 1320, and provides received symbols for subcarriers used for OFDM to a data demodulator 1330.

To recover CDM data, IDFT unit 1320 performs an L-point IDFT on L received symbols for subcarriers used for CDM in an OFDM symbol period and provides L time-domain samples. An RX CDM processor 1322 processes the time-domain samples and provides received signaling and decoded data for CDM. Processor 1322 may include units 1214 through 1228 in FIG. 12. To recover OFDM data, data demodulator 1330 performs data detection the received symbols from demapper 1316 with a channel estimate and provides data symbol estimates. A deinterleaver/decoder 1332 deinterleaves and decodes the data symbol estimates and provides decoded data for OFDM.

For clarity, various aspects of the techniques have been specifically described for forward link transmission with CDM and OFDM in an HRPD system. The techniques may also be used for other combinations of multiplexing schemes such as, e.g., CDM and SC-FDM, CDM and TDM and OFDM, TDM and OFDM, etc. The techniques may also be used for other wireless communication systems and for both the forward and reverse links.

Figure 14:
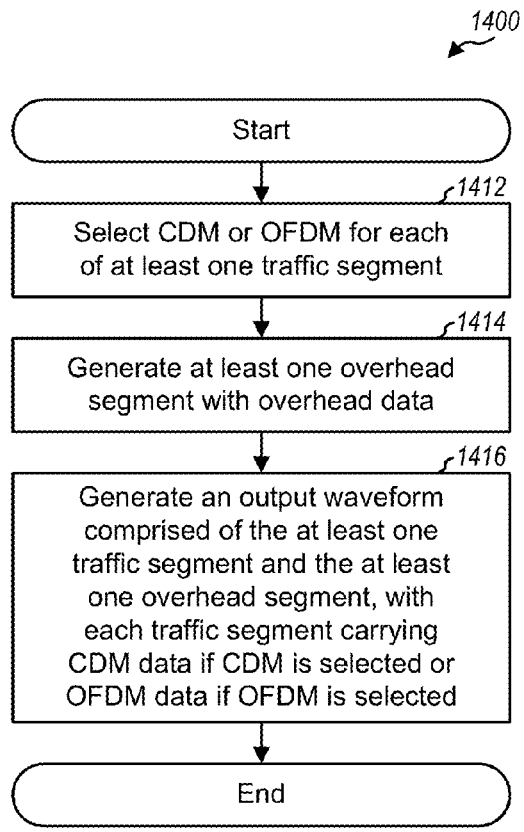
FIG. 14 shows a process for sending data with selectable CDM and OFDM.

FIG. 14 shows a process 1400 for sending data in traffic segments with selectable CDM and OFDM. CDM or OFDM may be selected for each of at least one traffic segment (block 1412). Each traffic segment may correspond to specific time and frequency resources and may carry CDM data or OFDM data for unicast data sent to one or more specific terminals. At least one overhead segment with overhead data may be generated (block 1414). An output waveform comprised of the at least one traffic segment and the at least one overhead segment may be generated, with each traffic segment carrying CDM data if CDM is selected for the traffic segment or OFDM data if OFDM is selected for the traffic segment (block 1416).

For a single carrier, CDM or OFDM may be selected for each of first and second traffic segments in a half-slot. An output waveform comprised of the first and second traffic segments and an overhead segment may be generated for the half-slot, e.g., as shown in FIG. 3B. For multiple carriers, CDM or OFDM may be selected for each of multiple traffic segments for the multiple carriers. Multiple overhead segments with overhead data may also be generated for the multiple carriers. An output waveform comprised of the multiple traffic segments and the multiple overhead segments for the multiple carriers may be generated, e.g., as shown in FIGS. 5 through 7.

For both single carrier and multiple carriers, the output waveform may be generated based on (i) a first waveform comprised of traffic segments carrying CDM data and overhead segments carrying overhead data and (ii) a second waveform comprised of traffic segments carrying OFDM data, e.g., as shown in FIG. 10. Alternatively, CDM data may be mapped to subcarriers used for traffic segments carrying CDM data, OFDM data may be mapped to subcarriers used for traffic segments carrying OFDM data, and overhead data may be mapped to subcarriers used for overhead segments. An output waveform may then be generated based on the mapped CDM data, OFDM data, and overhead data, e.g., as shown in FIG. 11.

Figure 15:
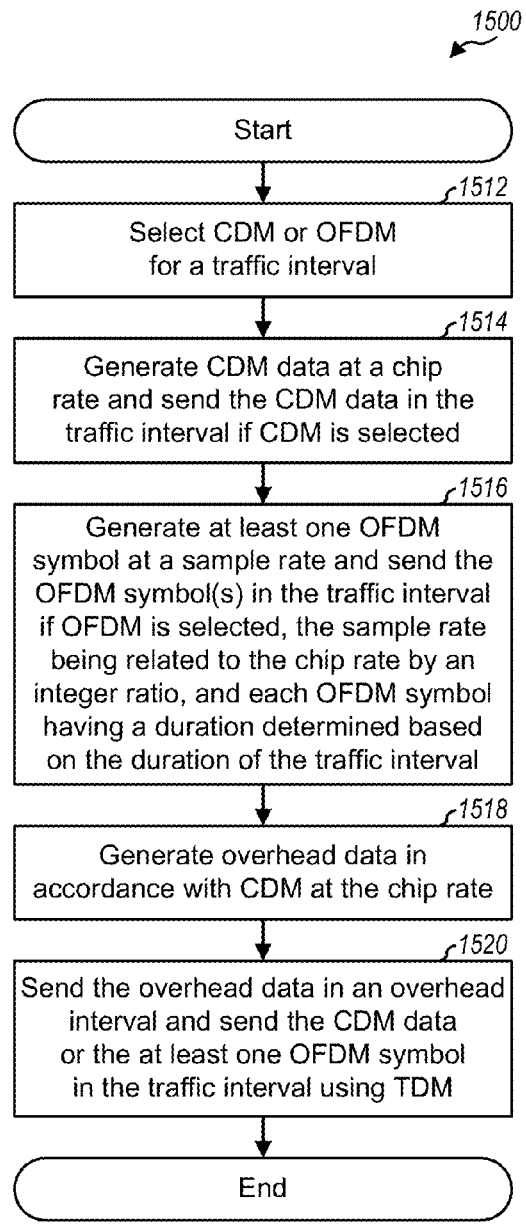
FIG. 15 shows a process for sending data with suitable OFDM symbol numerology.

FIG. 15 shows a process 1500 for sending data with CDM or OFDM based on suitably selected OFDM symbol numerology. CDM or OFDM may be selected for a traffic interval, or a traffic segment in the traffic interval (block 1512). CDM data may be generated at a chip rate and sent in the traffic interval if CDM is selected (block 1514). At least one OFDM symbol may be generated at a sample rate and sent in the traffic interval if OFDM is selected (block 1516). The sample rate may be related to the chip rate by an integer ratio. Each OFDM symbol may have a duration that is determined based on the duration of the traffic interval. Overhead data may be generated in accordance with CDM at the chip rate (block 1518). The overhead data may be sent in an overhead interval, and the CDM data or the at least one OFDM symbol may be sent in the traffic interval using TDM (block 1520).

For HRPD, the CDM data may be generated at a chip rate of 1.2288 Mcps. The at least one OFDM symbol may be generated at a sample rate of 1.2288×n Msps, where n is the integer ratio. The traffic interval may span 400 chips, and each OFDM symbol may have a duration of 400/m chips, where m is an integer divisor. Each OFDM symbol may cover K subcarriers, where K may be an integer that is not a power of two.

For the traffic interval, CDM data may be generated at the chip rate for at least one carrier in a spectral allocation, and at least one OFDM symbol may be generated at the sample rate for remaining usable subcarriers in the spectral allocation. For the overhead interval, at least one long OFDM symbol may be generated at the sample rate and may have a duration that is determined based on the duration of the overhead interval, e.g., as shown in FIGS. 6 and 7.

Figures 16, 17:
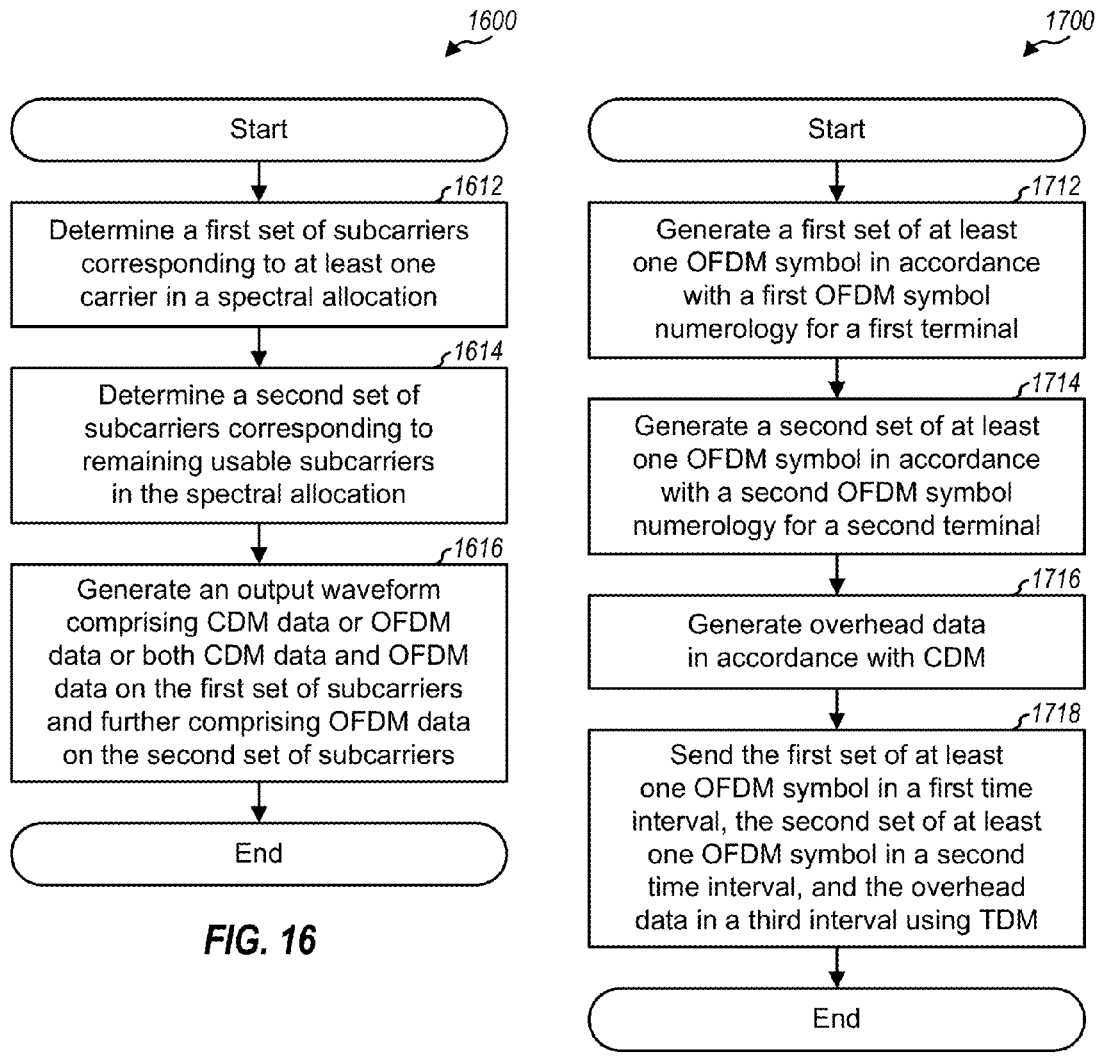
FIG. 16 shows a process for efficiently sending data using available resources.
FIG. 17 shows a process for sending data with multiple OFDM symbol numerologies.

FIG. 16 shows a process 1600 for efficiently sending data using the available time frequency resources. A first set of subcarriers corresponding to at least one carrier in a spectral allocation may be determined (block 1612). A second set of subcarriers corresponding to remaining usable subcarriers in the spectral allocation may also be determined (block 1614). If multiple carriers are present, then a transition band may be provided between adjacent carriers and may be determined based on a transition edge of a pulse shaping filter used to generate CDM data. The first set may exclude null subcarriers between carriers carrying different types of data. The first and second sets may exclude guard subcarriers.

An output waveform comprising CDM data or OFDM data or both CDM data and OFDM data on the first set of subcarriers and further comprising OFDM data on the second set of subcarriers may be generated (block 1616). The output waveform may comprise CDM data or OFDM data on subcarriers corresponding to each carrier. The output waveform may further comprise overhead data for the at least one carrier and OFDM data on a third set of subcarriers in an overhead interval. The third set may contain remaining usable subcarriers in the overhead interval.

FIG. 17 shows a process 1700 for sending data with dynamically selectable OFDM symbol numerologies. A first set of at least one OFDM symbol may be generated in accordance with a first OFDM symbol numerology for a first terminal (block 1712). A second set of at least one OFDM symbol may be generated in accordance with a second OFDM symbol numerology for a second terminal (block 1714). The first and second OFDM symbol numerologies may be associated with different OFDM symbol durations, different numbers of subcarriers, different cyclic prefix lengths, etc. Overhead data may be generated in accordance with CDM (block 1716). The first set of at least one OFDM symbol may be sent in a first time interval, the second set of at least one OFDM symbol may be sent in a second time interval, and the overhead data may be sent in a third interval using TDM (block 1718).

Figure 18:
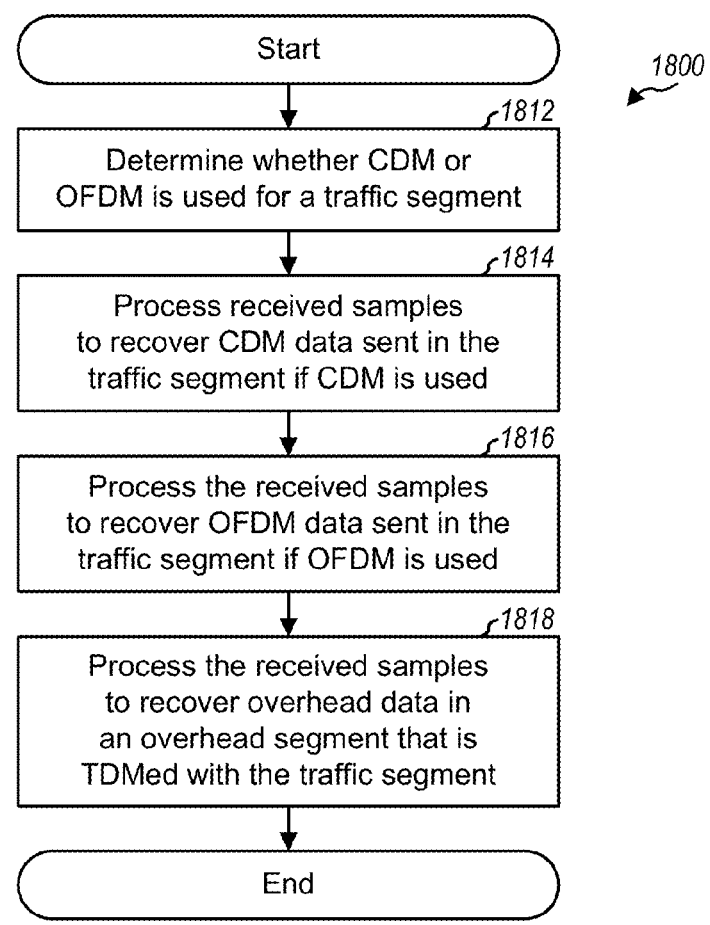
FIG. 18 shows a process for receiving data sent with CDM or OFDM.

FIG. 18 shows a process 1800 for receiving data sent with CDM or OFDM. A determination may be made whether CDM or OFDM is used for a traffic segment (block 1812). Received samples may be processed to recover CDM data sent in the traffic segment if CDM is used (block 1814). The received samples may be processed to recover OFDM data sent in the traffic segment if OFDM is used (block 1816). The received samples may also be processed to recover overhead data in an overhead segment that is TDMed with the traffic segment (block 1818).

To recover OFDM data, the received samples may be processed (e.g., cyclic prefix removed, inverse transformed, and demapped) to obtain received symbols for subcarriers used for the traffic segment. The received symbols may then be processed (e.g., demodulated, deinterleaved, and decoded) to recover the OFDM data sent in the traffic segment, e.g., as shown in FIG. 12 or 13. The OFDM data may also be recovered in other manners.

To recover CDM data, the received samples may be filtered to obtain filtered samples for subcarriers used for the traffic segment. The filtered samples may be processed (e.g., descrambled) to obtain input samples for the traffic segment. The input samples may be decovered with multiple orthogonal codes (e.g., Walsh codes) to obtain received symbols. The received symbols may then be processed (e.g., demodulated, deinterleaved, and decoded) to recover the CDM data sent in the traffic segment, as shown in FIG. 12. Alternatively, the received samples may be processed (e.g., cyclic prefix removed, inverse transformed, and demapped) to obtain frequency-domain symbols for a plurality of subcarriers. Frequency-domain symbols for subcarriers used for the traffic segment may be processed (e.g., transformed) to obtain time-domain samples. The time-domain samples may be decovered with multiple orthogonal codes to obtain received symbols. The received symbols may then be processed (e.g., demodulated, deinterleaved, and decoded) to recover the CDM data sent in the traffic segment, e.g., as shown in FIG. 13. The CDM data may also be recovered in other manners.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method within an apparatus, comprising:
    determining a first set of subcarriers corresponding to at least one carrier in a spectral allocation;
    determining a second set of subcarriers corresponding to remaining usable subcarriers in the spectral allocation; and
    generating an output waveform for simultaneous transmission comprising mixed code division multiplexing (CDM) data and orthogonal frequency division multiplexing (OFDM) data on the first set of subcarriers, OFDM data on the second set of subcarriers and OFDM data on a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises OFDM data, wherein generating the output waveform further comprises generating overhead data for the third set of subcarriers in the overhead interval.

2. An apparatus comprising:
    at least one processor configured to determine a first set of subcarriers corresponding to
    at least one carrier in a spectral allocation, to determine a second set of subcarriers corresponding to remaining usable subcarriers in the spectral allocation, and to generate an output waveform for simultaneous transmission comprising mixed code division multiplexing (CDM) data and orthogonal frequency division multiplexing (OFDM) data on the first set of subcarriers, OFDM data on the second set of subcarriers and OFDM data on a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises OFDM data, wherein the at least one processor generates overhead data for third set of subcarriers in the overhead interval; and a memory coupled to the at least one processor.

3. The apparatus of claim 2, wherein the at least one processor determines the third set of subcarriers corresponding to remaining usable subcarriers in the overhead interval.

4. The apparatus of claim 2, wherein the at least one carrier comprises multiple carriers, and wherein the at least one processor generates the output waveform comprising CDM data or OFDM data on subcarriers corresponding to each of the multiple carriers and further comprising OFDM data on the second set of subcarriers.

5. The apparatus of claim 4, wherein the at least one processor determines at least one null subcarrier between a carrier with CDM data and an adjacent carrier with OFDM data, and wherein the first set of subcarriers excludes null subcarriers between the multiple carriers.

6. An apparatus comprising:
means for determining a first set of subcarriers corresponding to at least one carrier in a spectral allocation;
means for determining a second set of subcarriers corresponding to remaining usable subcarriers in the spectral allocation; and
means for generating an output waveform for simultaneous transmission comprising mixed code division multiplexing (CDM) data and orthogonal frequency division multiplexing (OFDM) data on the first set of subcarriers, OFDM data on the second set of subcarriers and OFDM data on a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises OFDM data, wherein the means for generating the output
waveform further comprises means for generating overhead data for the third set of subcarriers in the overhead interval.

7. A method for wireless communication in a communication system, the method comprising:
determining a first set of subcarriers corresponding to at least one carrier in a spectral allocation;
determining a second set of subcarriers corresponding to remaining usable subcarriers in the spectral allocation; and
generating an output waveform for simultaneous transmission comprising mixed code division multiplexing (CDM) data and frequency division multiplexing access data on the first set of subcarriers, frequency division multiplexing access data on at least one subcarrier of the second set of subcarriers and frequency division multiplexing access data on at least one subcarrier of a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises frequency division multiplexing access data, wherein generating the output waveform further comprises generating overhead data for the at least one subcarrier of the third set of subcarriers in the overhead interval.

8. The method as defined in claim 7, wherein the frequency division multiplexing access data is one or more of Orthogonal Frequency Division Multiplexing Access (OFDMA) data and Single Carrier Frequency Division Multiplexing Access (SC-FDMA) data.

9. The method as defined in claim 7, wherein the communication system is at least one of a Long Term Evolution (LTE), LTE Advanced, Universal Terrestrial Radio Access (UTRA), or Evolved UTRA (E-UTRA).

10. The method as defined in claim 7, further comprising determining the at least one subcarrier of the third set of subcarriers that corresponds to at least one remaining usable subcarrier in the overhead internal.

11. The method as defined in claim 7, further comprising determining at least one null subcarrier between a carrier with CDM data and an adjacent carrier with frequency division multiplexed access data, and wherein the first set of subcarriers excludes the at least one determined null subcarrier.

12. An apparatus for wireless communication in a communication system, the apparatus comprising:
at least one processor configured to determine a first set of subcarriers corresponding to at least one carrier in a spectral allocation; determine a second set of subcarriers corresponding to remaining usable subcarriers in the spectral allocation; and generate an output waveform for simultaneous transmission comprising mixed code division multiplexing (CDM) data and frequency division multiplexing access data on the first set of subcarriers, frequency division multiplexing access data on at least one subcarrier of the second set of subcarriers and frequency division multiplexing access data on at least one subcarrier of a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises frequency division multiplexing access data, wherein generating the output waveform further comprises generating overhead data for the at least one subcarrier of the third set of subcarriers in the overhead interval.

13. The apparatus as defined in claim 12, wherein the frequency division multiplexing access data is one or more of Orthogonal Frequency Division Multiplexing Access (OFDMA) data and Single Carrier Frequency Division Multiplexing Access (SC-FDMA) data.

14. The apparatus as defined in claim 12, wherein the communication system is at least one of a Long Term Evolution (LTE), LTE Advanced, Universal Terrestrial Radio Access (UTRA), or Evolved UTRA (E-UTRA).

15. The apparatus as defined in claim 12, wherein the at least one processor is further configured to determine the at least one subcarrier of the third set of subcarriers that corresponds to at least one remaining usable subcarrier in the overhead internal.

16. The apparatus as defined in claim 12, wherein the at least one processor is further configured to determine at least one null subcarrier between a carrier with CDM data and an adjacent carrier with frequency division multiplexed access data, and wherein the first set of subcarriers excludes the at least one determined null subcarrier.

17. An apparatus for use in a communication system, the apparatus comprising:
means for determining a first set of subcarriers corresponding to at least one carrier in a spectral allocation;
means for determining a second set of subcarriers corresponding to remaining usable subcarriers in the spectral allocation; and means for generating an output waveform for simultaneous transmission comprising mixed code division multiplexing (CDM) data and frequency division multiplexing access data on the first set of subcarriers, frequency division multiplexing access data on at least one subcarrier of the second set of subcarriers and frequency division multiplexing access data on at least one subcarrier of a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises frequency division multiplexing access data, wherein generating the output waveform further comprises generating overhead data for the at least one subcarrier of the third set of subcarriers in the overhead interval.

18. The apparatus as defined in claim 17, wherein the frequency division multiplexing access data is one or more of Orthogonal Frequency Division Multiplexing Access (OFDMA) data and Single Carrier Frequency Division Multiplexing Access (SC-FDMA) data.

19. The apparatus as defined in claim 17, wherein the communication system is at least one of a Long Term Evolution (LTE), LTE Advanced, Universal Terrestrial Radio Access (UTRA), or Evolved UTRA (E-UTRA).

20. The apparatus as defined in claim 17, further comprising means for determining the at least one subcarrier of the third set of subcarriers that corresponds to at least one remaining usable subcarrier in the overhead internal.

21. The apparatus as defined in claim 17, further comprising means for determining at least one null subcarrier between a carrier with CDM data and an adjacent carrier with frequency division multiplexed access data, and wherein the first set of subcarriers excludes the at least one determined null subcarrier.

22. A computer program product, comprising:
a non-transitory computer-readable medium comprising:
code for causing a computer to determine a first set of subcarriers corresponding to at least one carrier in a spectral allocation;
code for causing a computer to determine a second set of subcarriers corresponding to remaining usable subcarriers in the spectral allocation; and code for causing a computer to generate an output waveform for simultaneous transmission comprising mixed code division multiplexing (CDM) data and frequency division multiplexing access data on the first set of subcarriers, frequency division multiplexing access data on at least one subcarrier of the second set of subcarriers and frequency division multiplexing access data on at least one subcarrier of a third set of subcarriers in an overhead interval, wherein a half-slot in a carrier of the at least one carrier comprises at least two traffic segments, and wherein a first segment of the at least two traffic segments comprises CDM data and a second segment of the at least two traffic segments comprises frequency division multiplexing access data, wherein generating the output waveform further comprises generating overhead data for the at least one subcarrier of the third set of subcarriers in the overhead interval.

23. The computer program product as defined in claim 22, wherein the frequency division multiplexing access data is one or more of Orthogonal Frequency Division Multiplexing Access (OFDMA) data and Single Carrier Frequency Division Multiplexing Access (SC-FDMA) data.

24. The computer program product as defined in claim 22, wherein the communication system is at least one of a Long Term Evolution (LTE), LTE Advanced, Universal Terrestrial Radio Access (UTRA), or Evolved UTRA (E-UTRA).

25. The computer program product as defined in claim 22, the computer-readable medium further comprising:
code for causing a computer to determine the at least one subcarrier of the third set of subcarriers that corresponds to at least one remaining usable subcarrier in the overhead internal.

26. The computer program product as defined in claim 22, the computer-readable medium further comprising:
code for causing a computer to determine at least one null subcarrier between a carrier with CDM data and an adjacent carrier with frequency division multiplexed access data, and wherein the first set of subcarriers excludes the at least one determined null subcarrier.

* * * * *